US009396030B2

(12) United States Patent
Kuang et al.

(10) Patent No.: US 9,396,030 B2
(45) Date of Patent: Jul. 19, 2016

(54) QUOTA-BASED ADAPTIVE RESOURCE BALANCING IN A SCALABLE HEAP ALLOCATOR FOR MULTITHREADED APPLICATIONS

(71) Applicant: Samsung Electronics Company, Ltd., Suwon, Gyeonggi-Do (KR)

(72) Inventors: Jilong Kuang, San Jose, CA (US); Daniel G. Waddington, Morgan Hill, CA (US); Chen Tian, Union City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 14/059,893

(22) Filed: Oct. 22, 2013

(65) Prior Publication Data

US 2014/0282589 A1 Sep. 18, 2014

Related U.S. Application Data

(60) Provisional application No. 61/779,949, filed on Mar. 13, 2013.

(51) Int. Cl.
  *G06F 9/46* (2006.01)
  *G06F 9/50* (2006.01)
  *G06F 12/02* (2006.01)
  *G06F 12/08* (2016.01)

(52) U.S. Cl.
  CPC ............ *G06F 9/5016* (2013.01); *G06F 12/023* (2013.01); *G06F 9/50* (2013.01); *G06F 12/0284* (2013.01); *G06F 12/08* (2013.01); *G06F 12/0811* (2013.01); *G06F 12/0897* (2013.01); *G06F 2212/1024* (2013.01)

(58) Field of Classification Search
  None
  See application file for complete search history.

(56) References Cited

U.S. PATENT DOCUMENTS

| | | | | |
|---|---|---|---|---|
| 6,058,460 | A * | 5/2000 | Nakhimovsky | G06F 9/5016 707/999.202 |
| 7,529,903 | B2 * | 5/2009 | Boss | G06F 3/0605 711/165 |
| 7,533,236 | B1 * | 5/2009 | Nordquist | G06F 9/5016 711/100 |
| 8,677,081 | B1 * | 3/2014 | Wentzlaff | G06F 12/0811 711/130 |

(Continued)

OTHER PUBLICATIONS

Schneider, S. et al., "Scalable Locality-Conscious Multithreaded Memory Allocation", Proceedings of the 5th International Symposium on Memory Management (ISMM '06), Jun. 10, 2006, pp. 1-11, ACM, United States.

Kamp, P-H., "Malloc(3) revisited", Proceedings of the annual conference on USENIX annual Technical Conference (ATEC '98), Jun. 15, 1998, pp. 1-6, ACM, United States.

(Continued)

*Primary Examiner* — Hiren Patel
(74) *Attorney, Agent, or Firm* — Sherman IP LLP; Kenneth L. Sherman; Hemavathy Perumal

(57) ABSTRACT

One embodiment comprises a hierarchical heap allocator system. The system comprises a system-level allocator for monitoring run-time resource usage information for an application having multiple application threads. The system further comprises a process-level allocator for dynamically balancing resources between the application threads based on the runtime resource usage information. The system further comprises multiple thread-level allocators. Each thread-level allocator facilitates resource allocation and resource deallocation for a corresponding application thread.

28 Claims, 26 Drawing Sheets

(56) References Cited

U.S. PATENT DOCUMENTS

| | | | |
|---|---|---|---|
| 8,904,068 B2* | 12/2014 | Durant | G06F 9/5016 710/56 |
| 8,966,204 B2* | 2/2015 | Chang | G06F 12/0866 711/118 |
| 9,063,668 B1* | 6/2015 | Jung | G06F 3/0658 |
| 9,063,795 B2* | 6/2015 | Bird | G06F 9/50 |
| 9,152,549 B1* | 10/2015 | Kesselman | G06F 12/023 |
| 2004/0250041 A1* | 12/2004 | Sollich | G06F 12/023 711/170 |
| 2005/0149940 A1* | 7/2005 | Calinescu | G06F 9/5061 718/104 |
| 2008/0313404 A1* | 12/2008 | Tago | G06F 12/0811 711/122 |
| 2009/0249352 A1* | 10/2009 | Hohensee | G06F 9/5088 718/105 |
| 2010/0211958 A1* | 8/2010 | Madison, Jr. | G06F 11/3433 718/105 |
| 2013/0007370 A1* | 1/2013 | Parikh | G06F 12/0842 711/129 |
| 2013/0046951 A1* | 2/2013 | Jones | G06F 12/023 711/171 |
| 2013/0117519 A1* | 5/2013 | Schreter | G06F 9/5016 711/165 |
| 2013/0262752 A1* | 10/2013 | Talagala | G06F 12/02 711/103 |

OTHER PUBLICATIONS

Lea, D., "A Memory Allocator", Apr. 4, 2000, pp. 1-8, United States [downloaded from http://g.oswego.edu/dl/html/malloc.html on Apr. 22, 2015].

Michael, M.M., "Scalable Lock-Free Dynamic Memory Allocation", Proceedings of the ACM SIGPLAN 2004 Conference on Programming language design and implementation (PLDI '04), Jun. 9-11, 2004, pp. 1-12, ACM, United States.

Gloger, W., Wolfram Gloger's Malloc homepage, Jun. 5, 2006, pp. 1-2, Germany [downloaded from http://www.malloc.de/en/ on Apr. 22, 2015].

Larson, P-A. et al., "Memory Allocation for Long-Running Server Applications", Proceedings of the 1st International Symposium on Memory Management, Oct. 1, 1998, pp. 1-10, ACM, United States.

Evans, J., "A Scalable Concurrent malloc (3) Implementation for FreeBSD", 2006, pp. 1-14, CiteSeer, United States.

Ghemawat, S. et al., "TCMalloc: Thread-Caching Malloc", Mar. 18, 2005, pp. 1-10, United States [downloaded from http://goog-perftools.sourceforge.net/doc/tcmalloc.html on Apr. 22, 2015].

Berger, E.D. et al., "Hoard: A Scalable Memory Allocator for Multithreaded Applications", Technical Report, 2000, pp. 1-12, ACM, United States.

* cited by examiner

QUOTA-BASED ADAPTIVE RESOURCE BALANCING IN A SCALABLE HEAP
ALLOCATOR FOR MULTITHREADED
APPLICATIONS

CROSS-REFERENCE TO RELATED APPLICATIONS

This application claims priority to U.S. Provisional Patent Application Ser. No. 61/779,949, filed on Mar. 13, 2013, which is incorporated herein by reference.

TECHNICAL FIELD

One or more embodiments relate generally to a heap allocator, and in particular, a hierarchical heap allocator.

BACKGROUND

Computer memory management is the act of managing computer memory in a computing system. Heap allocation is an example computer memory management mechanism. Any number of objects representing data may be allocated and freed in a memory pool called a heap. A heap allocator examines unused heap space to find space satisfying a memory allocation request.

SUMMARY

One embodiment comprises a hierarchical heap allocator system. The system comprises a system-level allocator for monitoring run-time resource usage information for an application having multiple application threads. The system further comprises a process-level allocator for dynamically balancing resources between the application threads based on the run-time resource usage information. The system further comprises multiple thread-level allocators. Each thread-level allocator facilitates resource allocation and resource deallocation for a corresponding application thread.

One embodiment provides a method for heap allocation. The method comprises monitoring run-time resource usage information for an application having multiple application threads, and dynamically balancing resources between the application threads based on the run-time resource usage information. Each application thread has a corresponding thread-level allocator that facilitates resource allocation and resource deallocation for the application thread.

One embodiment provides an apparatus for heap allocation. The apparatus comprises a resource balancer module for obtaining run-time resource usage information for an application having multiple application threads, and dynamically balancing resources between the application threads based on the run-time resource usage information. The apparatus further comprises at least one cached memory resource for at least one thread-level allocator. Each thread-level allocator facilitates resource allocation and resource deallocation for a corresponding application thread.

One embodiment provides a non-transitory computer-readable medium having instructions which when executed on a computer perform a method for heap allocation. The method comprises monitoring run-time resource usage information for an application having multiple application threads, and dynamically balancing resources between the application threads based on the run-time resource usage information. Each application thread has a corresponding thread-level allocator that facilitates resource allocation and resource deallocation for said application thread.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One embodiment comprises a hierarchical heap allocator system. The system comprises a system-level allocator for monitoring run-time resource usage information for an application having multiple application threads. The system further comprises a process-level allocator for dynamically balancing resources between the application threads based on the run-time resource usage information. The system further comprises multiple thread-level allocators. Each thread-level allocator facilitates resource allocation and resource deallocation for a corresponding application thread.

One embodiment provides a method for heap allocation. The method comprises monitoring run-time resource usage information for an application having multiple application threads, and dynamically balancing resources between the application threads based on the run-time resource usage information. Each application thread has a corresponding thread-level allocator that facilitates resource allocation and resource deallocation for the application thread.

One embodiment provides an apparatus for heap allocation. The apparatus comprises a resource balancer module for obtaining run-time resource usage information for an application having multiple application threads, and dynamically balancing resources between the application threads based on the run-time resource usage information. The apparatus further comprises at least one cached memory resource for at least one thread-level allocator. Each thread-level allocator facilitates resource allocation and resource deallocation for a corresponding application thread.

One embodiment provides a non-transitory computer-readable medium having instructions which when executed on a computer perform a method for heap allocation. The method comprises monitoring run-time resource usage information for an application having multiple application threads, and dynamically balancing resources between the application threads based on the run-time resource usage information. Each application thread has a corresponding thread-level allocator that facilitates resource allocation and resource deallocation for said application thread.

Figure 1:
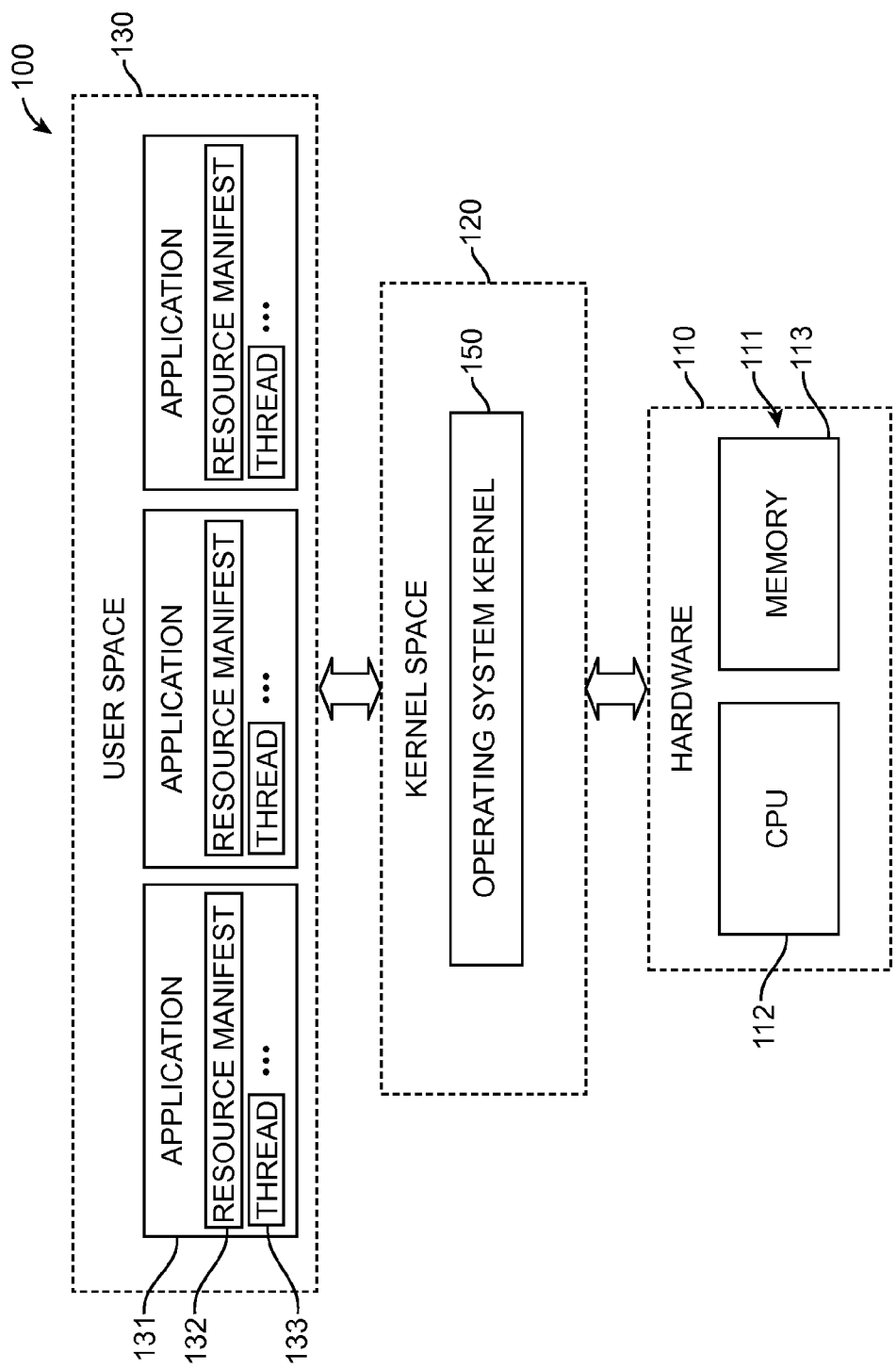
FIG. 1 shows a block diagram of a computing system, in accordance with an embodiment.

FIG. 1 shows a block diagram of a computing system 100, in accordance with an embodiment. The computing system 100 comprises hardware architecture 110, a kernel space 120, and a user space 130.

The hardware architecture 110 includes one or more computing resources 111, such as a central processing unit (CPU) 112 and a memory unit 113 providing one or more memory resources.

The user space 130 comprises at least one application program ("application") 131. An application 131 may be a multi-threaded application having multiple application threads ("threads") 133. Each application 131 has a corresponding resource manifest 132 that specifies a corresponding memory resource quota $M_{quota}$ for the application 131. A memory resource quota $M_{quota}$ for an application 131 represents the total amount of memory resources the application 131 is permitted to request.

The kernel space 120 executes an operating system kernel 150 that provides services for managing the computing resources 111 and facilitating how the applications 131 run and utilize the computing resources 111. The kernel 150 functions as an intermediary between the applications 131 and the computing resources 111. For example, the kernel 150 controls an attempt by a thread 133 of an application 131 to access/perform an operation (e.g., read, write, execute, append, etc.) on a computing resource 111 (e.g., files or directories maintained by a computing resource 111).

In one embodiment, the computing system 100 is an electronic device, such as a mobile phone (e.g., a smart phone), a tablet, a computer, a laptop, a server, etc.

Figure 2:
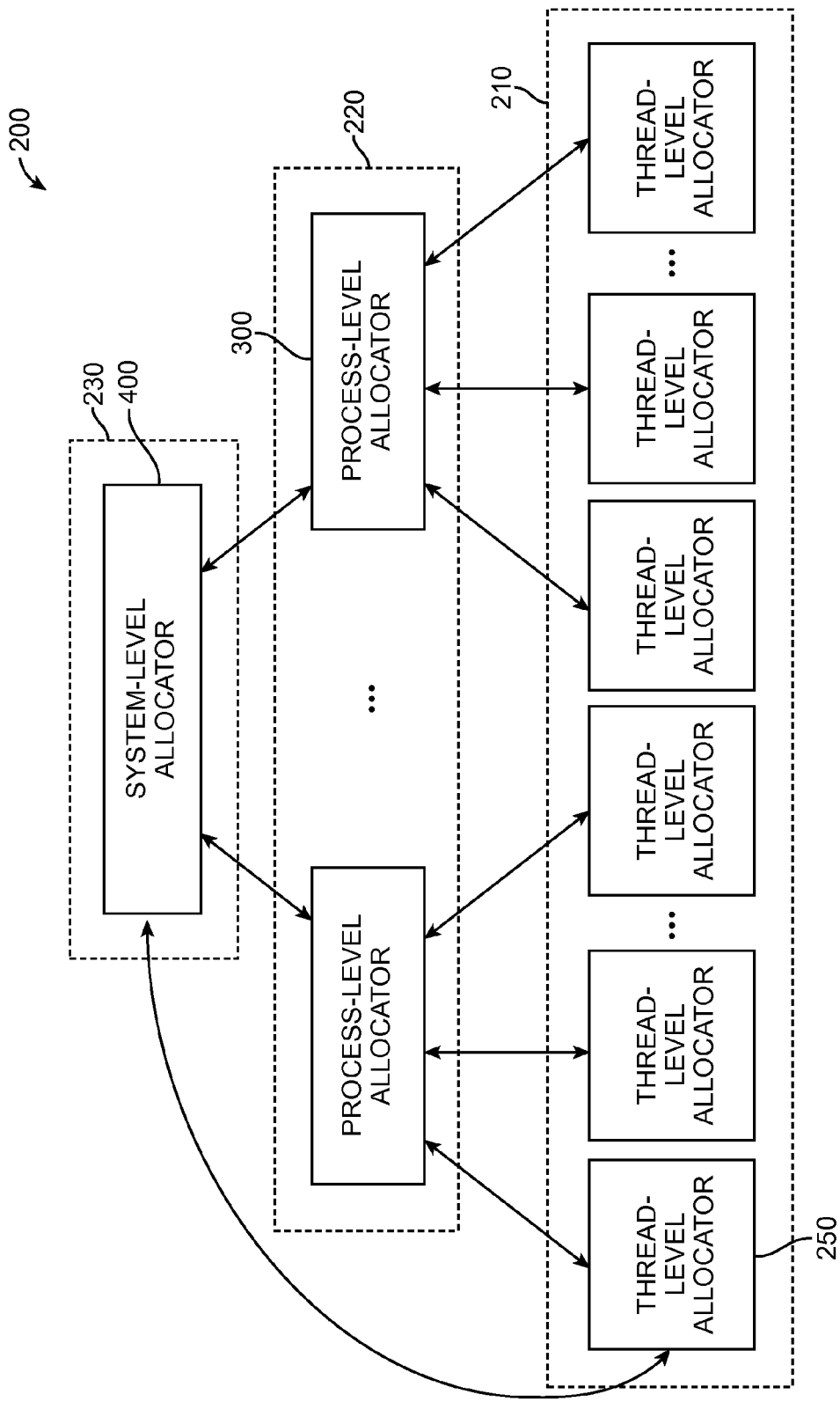
FIG. 2 illustrates a hierarchical heap allocator system for the computing system in FIG. 1, in accordance with an embodiment.

FIG. 2 illustrates a hierarchical heap allocator system 200 for the computing system 100 in FIG. 1, in accordance with an embodiment. The system 200 is a scalable and decentralized resource management system that monitors real-time/run-time resource usage of at least one application 131, and dynamically adapts resource balancing between threads 133 of each application 131.

In one embodiment, the system 200 is a three-level hierarchical heap allocator system. Specifically, the system 200 comprises a first level (i.e., bottom level) 210 comprising at least one thread-level allocator 250, a second level (i.e., middle level) 220 comprising at least one process-level allocator 300, and a third level (i.e., top level) 230 comprising at least one system-level allocator 400.

Each thread 133 of an application 131 has a corresponding thread-level allocator 250. A thread-level allocator 250 is a local allocator that locally handles resource allocation and resource deallocation for a corresponding thread 133. Each thread-level allocator 250 caches resources dedicated to a corresponding thread 133.

As described in detail later herein, each thread-level allocator 250 caches available memory chunks 262 representing memory resources available for allocation for a corresponding thread 133.

In this specification, a small object represents a small amount of memory, and a large object represents a large amount of memory. In one embodiment, a small object is less than or equal to 32 KB of memory, and a large object is greater than 32 KB of memory.

In one embodiment, each memory chunk 262 cached by each thread-level allocator 250 is a small object. Each thread-level allocator 250 locally satisfies a request from a corresponding thread 133 for an allocation of a small object (i.e., a small object allocation request) by providing one or more cached memory chunks 262 to the thread 133. Therefore, concurrent small object allocation requests from different threads 133 may be satisfied without lock contention. Each thread-level allocator 250 also locally satisfies a request from a corresponding thread 133 to deallocate a small object (i.e., a small object deallocation request) previously allocated to the thread 133.

Each application 131 has a corresponding process-level allocator 300. A process-level allocator 300 is a global allocator associated with each thread-level allocator 250 corresponding to each thread 133 of a corresponding application 131.

Each process-level allocator 300 caches available memory chunks 262 representing memory resources available for allocation for associated thread-level allocators 250. In one embodiment, each memory chunk 262 cached by each process-level allocator 300 is a small object. As described in detail later herein, a thread-level allocator 250 directly interacts with an associated process-level allocator 300 when the thread-level allocator 250 requests for, or frees up, small objects. For example, when an associated thread-level allocator 250 cannot locally satisfy a small object allocation request from a corresponding thread 133, the thread-level allocator 250 in turn sends a small object allocation request to a corresponding process-level allocator 300. Therefore, a process-level allocator 300 provides on-demand supply of memory resources to an associated thread-level allocator 250.

Each process-level allocator 300 also periodically monitors real-time/run-time resource usage statistics for each associated thread-level allocator 250. As described in detail later herein, a process-level allocator 300 adaptively/dynamically selects an appropriate resource balancing policy for balancing memory resources between threads 133 of a corresponding application 131 based on real-time/run-time resource usage statistics.

A system-level allocator 400 controls resource usage for one or more corresponding applications 131. In one embodiment, a system-level allocator 400 controls the maximum amount of memory resources that a corresponding application 131 is permitted to use. Specifically, the system-level allocator 400 monitors real-time/run-time resource usage statistics for a corresponding application 131, and enforces a corresponding memory resource quota $M_{quota}$ for the application 131 based on the real-time/run-time resource usage statistics. Therefore, the system 200 provides integrated memory quota-control.

A system-level allocator 400 is also a global allocator associated with each thread-level allocator 250 and each process-level allocator 300 for a corresponding application 131. A system-level allocator 400 caches available memory chunks 262 representing memory resources available for allocation for associated thread-level allocators 250 and process-level allocators 300. In one embodiment, each memory chunk 262 cached by each system-level allocator 400 is a large object.

As described in detail later herein, each thread-level allocator 250/process-level allocator 300 directly interacts with an associated system-level allocator 400 when the thread-level allocator 250/process-level allocator 300 requests for, or frees up, large objects (i.e., large object allocation requests and large object deallocation requests). Therefore, a system-level allocator 300 provides on-demand supply of memory resources to each associated thread-level allocator 250/process-level allocator 300.

In one embodiment, the system 200 is scalable on a multi-core architecture.

As a decentralized, per-thread heap allocator system, the system 200 incurs minimal synchronization overhead. As described in detail later herein, the system 200 effectively utilizes memory resources across all threads 133 by proactively balancing and pre-fetching memory resources among different levels of the system 200 based on real-time/run-time resource usage statistics, thereby minimizing thread starvation due to imbalanced resource placement. The thread-local handling, active pre-fetching and resource balancing also help minimize time for dynamic memory allocation.

The system 200 further provides improved memory access performance by eliminating false-sharing, improving temporal and/or spatial locality, and minimizing fragmentation.

The system 200 further provides improved support for quality of service (Qos) and/or security. For example, the system 200 allows for resource compartmentalization via its decentralized, per-thread heap allocator system. As another example, the system 200 prevents denial-of-service attacks by proactively balancing memory resources.

Figure 3:
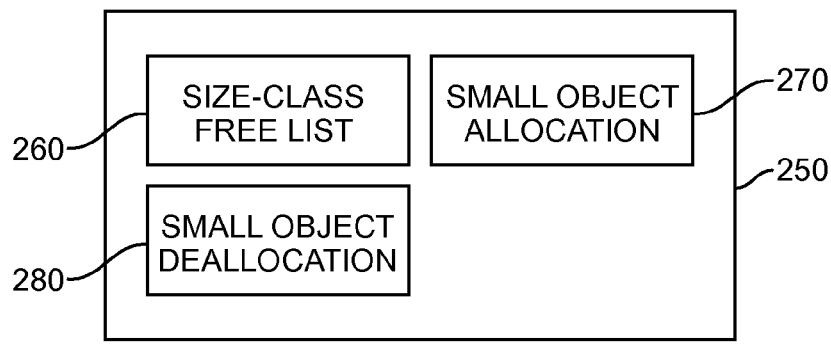
FIG. 3 illustrates an example thread-level allocator for a corresponding thread, in accordance with an embodiment.

FIG. 3 illustrates an example thread-level allocator 250 for a corresponding thread 133, in accordance with an embodiment. A thread-level allocator 250 provides thread-local handling of memory resources for a corresponding thread 133.

In one embodiment, a thread-level allocator 250 comprises a size-class free list 260, a small object allocation module 270, and a small object deallocation module 280. A thread-level allocator 250 caches memory resources available for allocation for a corresponding thread 133 by maintaining a repository of available memory chunks 262 representing small objects in its size-class free list 260. The memory chunks 262 are arranged in lists 261, wherein each list 261 corresponds to a particular small object size class representing a particular allocation size for a small object. In one embodiment, each list 261 is a linked list of memory chunks 262 having a particular allocation size for a small object.

The small object allocation module 270 handles each small object allocation request from the corresponding thread 133. Specifically, the small object allocation module 270 determines whether a memory chunk 262 satisfying a small object allocation request is available in the size-class free list 260. If a memory chunk 262 satisfying the request is available in the size-class free list 260, the small object allocation module 270 provides the available memory chunk 262 to the corresponding thread 133. If a memory chunk 262 satisfying the request is not available in the size-class free list 260, the small object allocation module 270 directly requests additional memory resources from an associated process-level allocator 300.

The small object deallocation module 280 handles each small object deallocation request received from a thread 133. Specifically, the small object deallocation module 280 caches a small object freed by a thread 133 in the size-class free list 260.

Figure 4:
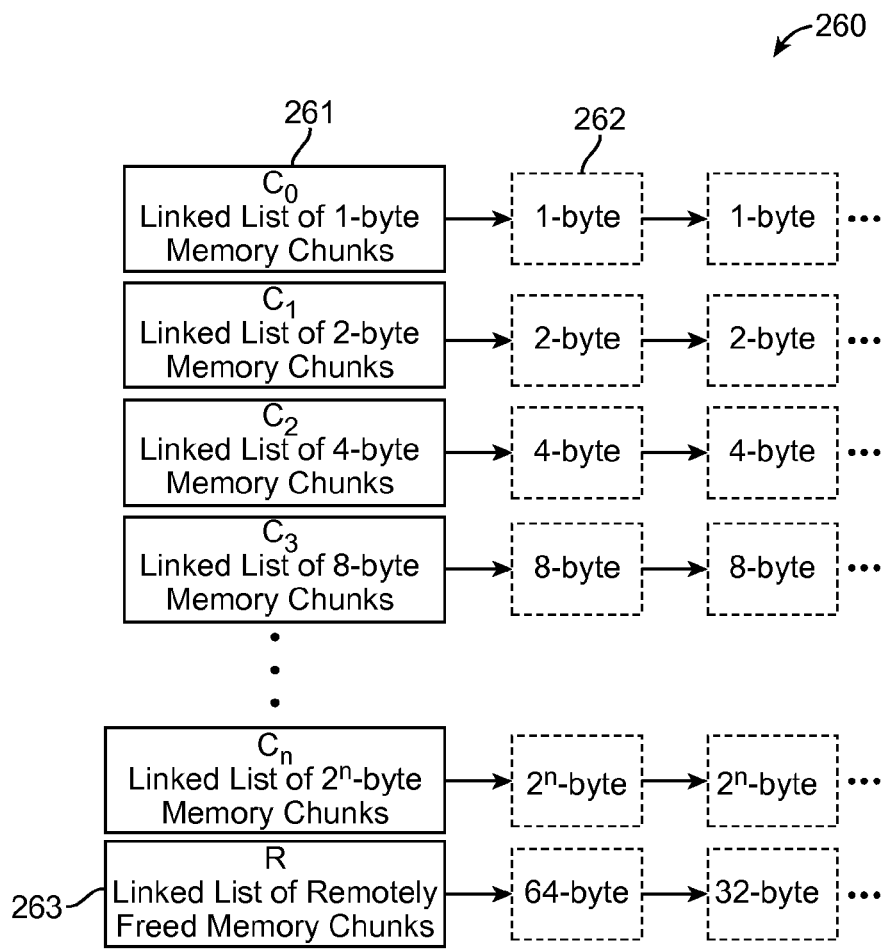
FIG. 4 illustrates an example size-class free list maintained by a thread-level allocator, in accordance with an embodiment.

FIG. 4 illustrates an example size-class free list 260 maintained by a thread-level allocator 250, in accordance with an embodiment. In one embodiment, the size-class free list 260 maintains one or more lists 261, wherein each list 261 corresponds to a particular size class for a small object.

In one embodiment, each small object size class represents an exponential of 2. A list 261 corresponding to size-class $C_n$ comprises a singly-linked list of available memory chunks 262, wherein each memory chunk 262 is $2^n$ bytes in size, and wherein n is an integer. For example, as shown in FIG. 4, the size-class free list 260 includes a first list 261 corresponding to size-class $C_0$ comprising a singly-linked list of available 1-byte (i.e., $2^0$) memory chunks 262, a second list 261 corresponding to size-class $C_1$ comprising a singly-linked list of available 2-byte (i.e., $2^1$) memory chunks 262, a third list 261 corresponding to size-class $C_2$ comprising a singly-linked list of available 4-byte (i.e., $2^2$) memory chunks 262, a fourth list 261 corresponding to size-class $C_3$ comprising a singly-linked list of available 8-byte (i.e., $2^3$) memory chunks 262, . . . , and an n−1 list 261 corresponding to size-class $C_n$ comprising a singly-linked list of $2^n$-byte memory chunks 262.

In one embodiment, the integer n is in the range $0 \leq n \leq 15$. Therefore, the smallest permitted size-class in the size-class free list 260 is 1-byte (i.e., $2^0$), and the largest permitted size-class in the size-class free list 260 is 32 KB (i.e., $2^{15}$).

In one embodiment, the size-class free list 260 further maintains a remotely-freed list 263 comprising a singly-linked list of memory chunks 262 remotely freed by threads 133 other than a corresponding thread 133. Unlike the lists 261, the remotely-freed list 263 maintains memory chunks 262 of different sizes.

Let x generally represent a size of a small object that a corresponding thread 133 requests for allocation from the thread-level allocator 250. The thread-level allocator 250 rounds up the size x to a size-class m representing the nearest permitted small object size-class that will satisfy the request. The thread-level allocator 250 then locates, in its size-class free list 260, a list 261 corresponding to size-class m. If the list 261 corresponding to size-class m comprises at least one available memory chunk 262, the thread-level allocator 250 returns a memory address corresponding to a first available memory chunk 262 in the list 261 to the corresponding thread 133, and removes the first available memory chunk 262 from the list 261. If the list 261 corresponding to size-class m does not have at least one available memory chunk 262, the thread-level allocator 250 repeats the process by incrementing size-class m and locating an available memory chunk 262 in a list 261 corresponding to the incremented size-class m. The process is repeated until either an available memory chunk 262 is located or the size-class m exceeds the largest permitted size-class in the size-class free list 260.

If an available memory chunk 262 is located, the thread-level allocator 250 returns a memory address for the available memory chunk 262 to the corresponding thread 133. If the available memory chunk 262 is larger than size x, the thread-level allocator 250 distributes any remaining portion of the available memory chunk 262 by chopping up the remaining portion of the available memory chunk 262 into smaller memory chunks 262, and inserting each smaller memory chunk 262 into an appropriate list 261 in its size-class free list 260.

In one embodiment, the thread-level allocator 250 will merge adjacent memory chunks 262 of a list 261 into a larger memory chunk 262 (i.e., coalesce).

If the size-class m exceeds the largest permitted size-class in the size-class free list 260, the thread-level allocator 250 will reclaim, if available, one or more available memory chunks 262 from the remotely-freed list 263. If the remotely-freed list 263 does not have at least one available memory chunk 262 that may be used to satisfy the request, the thread-level allocator 250 will request additional memory resources from an associated process-level allocator 300.

Table 1 below provides example pseudo code for handling a small object allocation request in a thread-level allocator 250.

TABLE 1

```
void* malloc_small_object (size_t x) {
    int m = calculate_size_class(x);
    int n = m;
    while (n<=MAX_SIZE) {
        if (there is free chunk on list n) {
            get the address of the first chunk p;
            distribute the remaining memory (2^n-2^m);
            return p;
        } else {
            n++; // go to the next size-class list
        }
    }
    check remotely-freely list and insert freed chunks;
    check coalescence;
    bool flag = check freed chunks whose size is larger or equal to 2^m;
    if (flag == true) {
        get the address of the chunk p and size y;
        distribute the remaining memory (y-2^m);
        return p;
    } else {
        request memory from PA;
        get the address of the chunk p and size y;
        distribute the remaining memory (y-2^m);
        return p;
    }
}
```

Table 2 below provides example pseudo code for handling a small object deallocation request in a thread-level allocator 250.

TABLE 2

```
void free_small_object (void * p) {
    int thread_id = get_home_thread(p);
    size_t block_size = get_block_size(p);
    int n = calculate_size_class(block_size);
    if (thread_id == my_thread_id) {
        insert to my size-class n free list;
        check coalescence;
    } else {
        insert to remotely-freed list in thread_id;
    }
}
```

Figure 5:
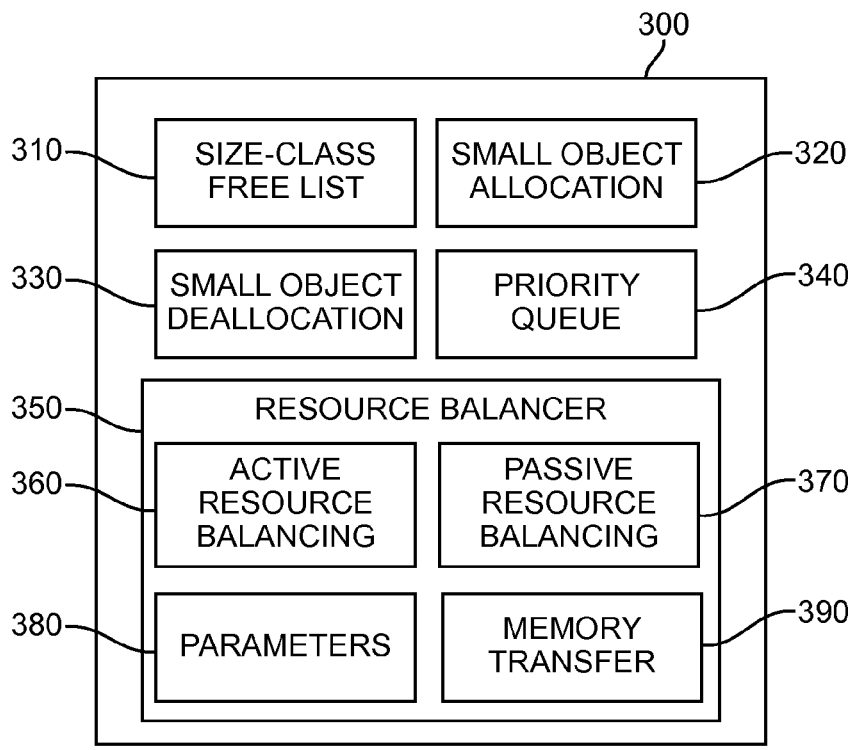
FIG. 5 illustrates an example process-level allocator, in accordance with an embodiment.

FIG. 5 illustrates an example process-level allocator 300, in accordance with an embodiment. In one embodiment, a process-level allocator 300 comprises a size-class free list 310, a small object allocation module 320, a small object deallocation module 330, a priority queue 340, and a resource balancer module 350.

A process-level allocator 300 caches memory resources available for allocation for associated thread-level allocators 250 by maintaining a repository of available memory chunks 262 representing small objects in its size-class free list 310. The memory chunks 262 are arranged in lists 261, wherein each list 261 corresponds to a particular small object size class representing a particular allocation size for a small object. In one embodiment, each list 261 is a linked list of memory chunks 262 having a particular allocation size for a small object.

The small object allocation module 320 handles each small object allocation request from each associated thread-level allocator 250. Specifically, the small object allocation module 320 determines whether a memory chunk 262 satisfying a small object allocation request from an associated thread-level allocator 250 is available in the size-class free list 310. If a memory chunk 262 satisfying the request is available in the size-class free list 310, the small object allocation module 320 provides the available memory chunk 262 to the associated thread-level allocator 250. If a memory chunk 262 satisfying the request is not available in the size-class free list 310, the small object allocation module 320 directly requests additional memory resources from an associated system-level allocator 400.

The small object deallocation module 330 handles each small object deallocation request received from each associated thread-level allocator 250. Specifically, the small object deallocation module 330 caches a small object freed by an associated thread-level allocator 250 in the size-class free list 310.

The priority queue 340 maintains pending small object allocation and/or deallocation requests from each associated thread-level allocator 250 in a queue. The modules 320 and 330 check the priority queue 340 for pending small object allocation requests and pending small object deallocation requests, respectively. In one embodiment, the modules 320 and 330 process pending small object allocation requests and pending small object deallocation requests in a first-in-first-out (FIFO) manner.

The resource balancer module 350 adaptively balances memory resources between all associated thread-level allocators 250, the process-level allocator 300, and an associated system-level allocator 400. Specifically, the resource balancer module 350 selects an appropriate resource balancing policy from a set of resource balancing policies based on real-time/run-time resource usage statistics, and applies the selected resource balancing policy.

The resource balancer module 350 adaptively balances memory resources based on real-time/run-time resource usage statistics provided by the associated system-level allocator 400. Therefore, the system 200 treats allocation-intensive threads 133 differently from other threads 133 in terms of resource provisioning.

When resources are plenty (i.e., the corresponding application 131 has a resource-rich application state), the resource balancer module 350 applies the active resource balancing policy wherein small objects are proactively cached in the process-level allocator 300 and the associated thread-level allocators 250 for future small object allocation requests. Therefore, the active resource balancing policy speeds up small object allocation requests.

When resources are limited (i.e., the corresponding application 131 has a resource-scarce application state), the resource balancer module 350 applies the passive resource balancing policy wherein excess small objects cached by the associated thread-level allocators 250 and the process-level allocator 300 are reclaimed to process-level allocator 300 and the associated system-level allocator 400, respectively. Further, during the passive resource balancing policy, the associated system-level allocator 400 and the process-level allocator 300 supply memory resources to the process-level allocator 300 and the associated thread-level allocators 250 on demand. Therefore, the passive resource balancing policy improves memory utilization efficiency.

In one embodiment, the resource balancer 350 comprises an active resource balancing unit 360 for implementing the active resource balancing policy, a passive resource balancing unit 370 for implementing the passive resource balancing policy, a parameters unit 380 for maintaining at least one configurable parameter value and/or at least one pre-determined parameter value, and a memory transfer unit 390 for implementing transfers of memory resources.

Let $U_0$ denote a current memory usage percentage for the corresponding application 131. The current memory usage percentage $U_0$ is represented by equation (1) provided below:

$$U_0 = M_{allocated} / M_{quota} * 100 \qquad (1)$$

$$= ((M_{used} + M_{cached}) / M_{quota}) * 100,$$

wherein $M_{allocated}$ represents an amount of memory resources allocated to the corresponding application 131 (i.e., a memory resource allocation), wherein $M_{quota}$ represents a memory resource quota for the corresponding application 131, wherein $M_{used}$ represents a total amount of memory resources used by the process-level allocator 300 and each associated thread-level allocator 250, and wherein $M_{cached}$ represents a total amount of memory resources cached by the process-level allocator 300 and each associated thread-level allocator 250.

The resource balancer module 350 monitors the application state of the corresponding application 131. The resource balancer module 350 determines that the corresponding application 131 is in a resource-rich application state if the current memory usage percentage $U_0$ is less than or equal to a threshold parameter Th. If the current memory usage percentage $U_0$ is greater than the threshold parameter Th, the resource balancer module 350 determines instead that the corresponding application 131 is in a resource-scarce application state. In one embodiment, the threshold parameter Th is maintained in the parameters unit 380.

In one embodiment, the threshold parameter Th is a configurable parameter value. For example, the threshold parameter Th may be based on resource usage patterns and a threading modal.

In one embodiment, the threshold parameter Th is a predetermined parameter value. For example, the threshold parameter Th may be set to 80%. The resource balancer module 350 determines that the corresponding application 131 is in a resource-rich application state if the current memory usage percentage $U_0$ is less than or equal to 80% (i.e., $0\% \leq U_0 \leq 80\%$). The resource balancer module 350 determines that the corresponding application 131 is in a resource-scarce application state if the current memory usage percentage $U_0$ is greater than 80% (i.e., $80\% < U_0 \leq 100\%$).

Let $Q_T$ denote a parameter value representing a resource caching capacity for each associated thread-level allocator 250. Let $Q_P$ denote a parameter value representing a resource caching capacity for the process-level allocator 300. In one embodiment, the parameters $Q_T$ and $Q_P$ are maintained in the parameters unit 380.

In one embodiment, the active resource balancing policy is implemented as follows: The process-level allocator 300 periodically checks each size-class free list 260 of each associated thread-level allocator 250 to ensure that the amount of cached memory resources in the size-class free list 260 is up to a corresponding resource caching capacity $Q_T$. The process-level allocator 300 also periodically checks its size-class free list 310 to ensure that the amount of cached resources in its size-class free list 310 is up to a corresponding resource caching capacity $Q_P$. If an associated thread-level allocator 250 is allocation-intensive and runs low on memory resources, the process-level allocator 300 proactively pushes additional memory resources to the thread-level allocator 250. In one embodiment, the process-level allocator 300 proactively pushes a minimum 64 bytes of memory to the thread-level allocator. If the process-level allocator 300 runs low on memory resources, the process-level allocator 300 proactively pulls additional memory resources from the associated system-level allocator 400. The process-level allocator 300 also checks the application state of the corresponding application 131 before and after each time the process-level allocator 300 interacts with the associated system-level allocator 400. When the application state of the corresponding application 131 transitions from a resource-rich application state to a resource-scarce application state, the process-level allocator 300 adaptively adopts the passive resource balancing policy.

The active resource balancing policy implements opportunistic pre-fetch of memory resources to maintain resources as close as possible to the corresponding application 131. During the active resource balancing policy, neither the process-level allocator 300 nor the associated system-level allocator 400 reclaims excess memory resources from each associated thread-level allocator 250 and the process-level allocator 300, respectively.

The active balancing resource policy substantially increases the success rate of small object allocation requests that are locally handled by the associated thread-level allocators 250. If an associated thread-level allocator 250 fails to locally satisfy a small object allocation request, the thread-level allocator 250 requests additional memory resources from the process-level allocator 300 (this, however, happens infrequently as the thread-level allocator 250 typically has sufficient cached memory resources; for example, the thread-level allocator 250 may request additional memory resources only when the thread-level allocator 250 has cached only smaller memory chunks 262 and does not have any available larger memory chunks 262 that satisfy the small object allocation request).

The active balancing resource policy further prevents/minimizes lock contention between all associated thread-level allocators 250, thereby significantly reducing synchronization overhead.

Each small object allocation request from an associated thread-level allocator 250 is queued in the priority queue 340. Before the process-level allocator 300 checks the size-class free list 260 of an associated thread-level allocator 250, the process-level allocator 300 checks the priority queue 340 for pending small object allocation requests and processes any pending small object allocation requests.

Table 3 below provides example pseudo code for implementing the active resource balancing policy. Let N represent the total number of associated thread-level allocators 250. Let $M_i$ represent an amount of memory resources cached by an associated thread-level allocator $T_i$. Let $M_P$ represent an amount of memory resources cached by the process-level allocator 300. Let $TA_j$ represent an associated thread-level allocator 300 with a small object allocation request, and let $S_j$ represent a size of the small object requested. Let mem_transfer(src, dest, amount) represent a routine for transferring available memory resources of size amount from source src to destination dst.

TABLE 3

```
for i = 1 → N do
    while priority queue is not empty do
        process the next request (size S_j) from TA_j
        Δ_j ← Max(S_j, 64)
        mem_transfer(PA, TA_j, Δ_j)
        if M_p < Q_p then
            Δ_p ← Q_p - M_p
            mem_transfer(SA, PA, Δ_p)
        end if
```

TABLE 3-continued

```
    end while
    if M_i < Q_T then
        Δ_i ← Max(Q_T - M_i, 64)
        mem_transfer(PA, TA_i, Δ_i)
    end if
    if M_p < Q_p then
        Δ_p ← Q_p - M_p
        mem_transfer(SA, PA, Δ_p)
    end if
end for
```

Table 4 below provides example pseudo code for implementing the mem_transfer(src, dest, amount) routine.

TABLE 4

```
if src=TA and dst=PA then
    num ← floor(amount/64)
    x ← num × 64
    move x bytes memory from TA to PA
end if
if src=PA and dst=TA then
    if (amount%64)=0 then
        num ← amount/64
    else
        num ← floor(amount/64) + 1
    end if
    x ← num × 64
    if PA does not have x bytes available memory then
        mem_transfer(SA, PA, x)
    end if
        move x bytes memory from PA to TA
end if
if src=PA and dst=SA then
    x ← floor(amount/4096)
    move x pages from PA to SA
end if
if src=SA and dst=PA then
    if (amount%4096)=0 then
        x ← amount/4096
    else
        x ← floor(amount/4096) + 1
    end if
    move x pages from SA to PA
end if
```

In one embodiment, the passive resource balancing policy is implemented as follows: the process-level allocator 300 periodically checks each size-class free list 260 of each associated thread-level allocator 250 to determine if the amount of cached memory resources in the size-class free list 260 exceeds a corresponding resource caching capacity $Q_T$. If the amount of cached memory resources in the size-class free list 260 exceeds the resource caching capacity $Q_T$, excess memory resources are proactively pulled from the thread-level allocator 300 to the process-level allocator 300. The process-level allocator 300 also periodically checks its own size-class free list 310 to determine if the amount of cached memory resources in its size-class free list 310 exceeds a corresponding resource caching capacity $Q_P$. If the amount of cached memory resources in its size-class free list 310 exceeds the resource caching capacity $Q_P$, excess memory resources are proactively pushed from the process-level allocator 300 to the associated system-level allocator 400. The passive resource balancing policy ensures that excess memory resources are returned to the associated system-level allocator 400 as quickly as possible.

Under the passive resource balancing policy, memory resources are supplied on-demand. Specifically, the process-level allocator 300 provides an associated thread-level allocator 250 with memory resources only when the thread-level allocator 250 requests the memory resources. Further, the associated system-level allocator 400 provides the process-level allocator 300 with memory resources only when the process-level allocator 300 requests the memory resources. After the process-level allocator 300 reclaims memory resources by proactively pulling excess memory resources from the associated thread-level allocators 250, the process-level allocator 300 checks the priority queue 400 and attempts to satisfy all pending small object allocation requests.

The passive resource balancing policy trades speed with improved memory utilization efficiency. When there are limited memory resources (i.e., the corresponding application 131 has a resource-scarce application state), it is preferable to move excess memory resources from the associated thread-level allocators 250 to either the process-level allocator 300 or the associated system-level allocator 400, thereby increasing the success rate of satisfying a future resource allocation request from any thread-level allocator 250. The passive resource balancing policy is implemented in a bottom-up fashion: 1) proactively reclaim as many excess memory resources as possible from the associated thread-level allocators 250 and the process-level allocator 300, and 2) reactively provide memory resources to the process-level allocator 300 and the associated thread-level allocators 250 on-demand.

Table 5 below provides example pseudo code for implementing the passive resource balancing policy.

TABLE 5

```
for i = 1 → N do
    if M_i > Q_T then
        Δ_i ← M_i - Q_T
        if Δ_i ≥ 64 then
            mem_transfer(TA, PA, Δ_i)
        end if
    end if
end for
while priority queue is not empty do
    process the next request (size S_j) from TA_j
    Δ_j ← Max(S_j, 64)
    mem_transfer(PA, TA_j, Δ_j)
end while
if M_p > Q_p then
    Δ_p ← M_p - Q_p
    if Δ_p ≥ 4096 then
        mem_transfer(PA, SA, Δ_p)
    end if
end if
```

In another embodiment, each process-level allocator 300 is event-trigger based. For example, a process-level allocator 300 is triggered only when an event occurs, such as a small object allocation request or a small object deallocation request from an associated thread-level allocator 250. The process-level allocator 300 implements adaptive resource balancing policy on a per-event basis rather than a fixed time interval. In one example implementation, the process-level allocator 300 scans each associated thread-level allocator 250 for resource balancing when the process-level allocator 300 is triggered. In another example implementation, the process-level allocator 300 scans only the associated thread-level allocator 250 that triggered the process-level allocator 300 for resource balancing.

Figure 6:
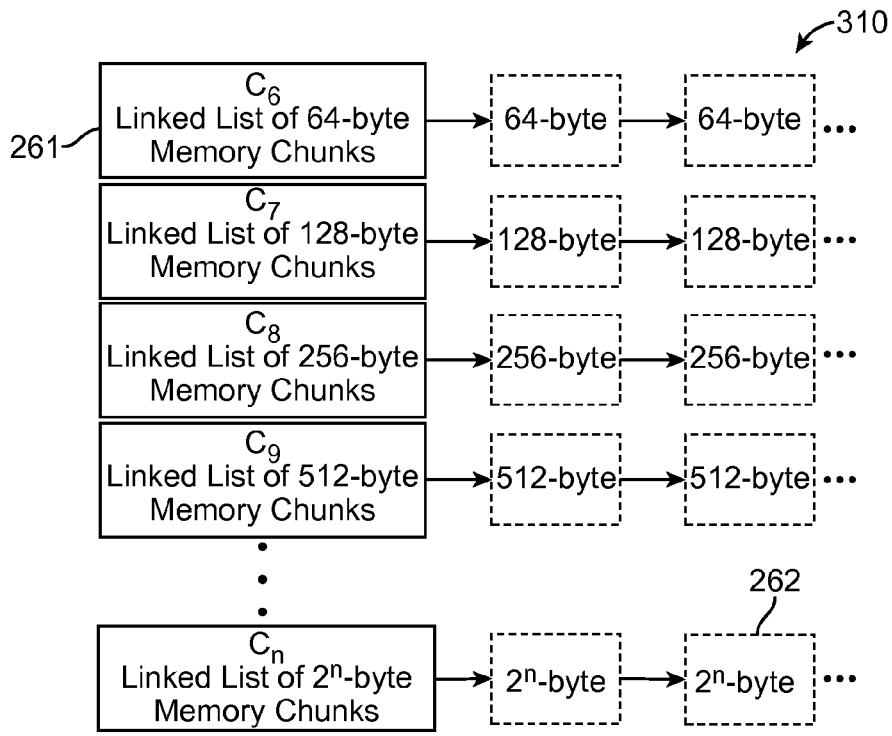
FIG. 6 illustrates an example size-class free list maintained by a process-level allocator, in accordance with an embodiment.

FIG. 6 illustrates an example size-class free list 310 maintained by a process-level allocator 300, in accordance with an embodiment.

In one embodiment, the size-class free list 310 maintains one or more lists 261, wherein each list 261 corresponds to a particular size class for a small object. In one embodiment, the smallest permitted size-class in the size-class free list 310 is 64-byte. This prevents false sharing between threads 133 as the size of a cache line is typically 64 bytes.

For example, as shown in FIG. 6, the size-class free list 310 includes a first list 261 corresponding to size-class $C_6$ comprising a singly-linked list of available 64-byte (i.e., $2^6$) memory chunks 262, a second list 261 corresponding to size-class $C_7$ comprising a singly-linked list of available 128-byte (i.e., $2^7$) memory chunks 262, a third list 261 corresponding to size-class $C_8$ comprising a singly-linked list of available 256-byte (i.e., $2^8$) memory chunks 262, a fourth list 261 corresponding to size-class $C_9$ comprising a singly-linked list of available 512-byte (i.e., $2^3$) memory chunks 262, etc. In one embodiment, the largest permitted size-class in the size-class free list 310 is 32 KB (i.e., $2^{15}$).

Let x generally represent a size of a small object that an associated thread-level allocator 250 requests for allocation from the process-level allocator 300. The process-level allocator 300 rounds up the size x to a size-class m representing the nearest permitted small object size-class that will satisfy the request. The process-level allocator 300 then locates, in its size-class free list 310, a list 261 corresponding to size-class m. If the list 261 corresponding to size-class m comprises at least one available memory chunk 262, the process-level allocator 300 returns a memory address corresponding to a first available memory chunk 262 in the list 261 to the associated thread-level allocator 250, and removes the first available memory chunk 262 from the list 261. If the list 261 corresponding to size-class m does not have at least one available memory chunk 262, the process-level allocator 300 repeats the process by incrementing size-class m and locating an available memory chunk 262 in a list 261 corresponding to the incremented size-class m. The process is repeated until either an available memory chunk 262 is located or the size-class m exceeds the largest permitted size-class in the size-class free list 310.

If an available memory chunk 262 is located, the process-level allocator 300 returns a memory address for the available memory chunk 262 to the associated thread-level allocator 250. If the available memory chunk 262 is larger than size x, the process-level allocator 300 distributes any remaining portion of the available memory chunk 262 by chopping up the remaining portion of the available memory chunk 262 into smaller memory chunks 262, and inserting each smaller memory chunk 262 into an appropriate list 261 in its size-class free list 310.

In one embodiment, the process-level allocator 300 will merge adjacent memory chunks 262 of a list 261 into a larger memory chunk 262 (i.e., coalesce).

If the size-class m exceeds the largest permitted size-class in the size-class free list 310, the process-level allocator 300 will request additional memory resources from an associated system-level allocator 400.

Figure 7:
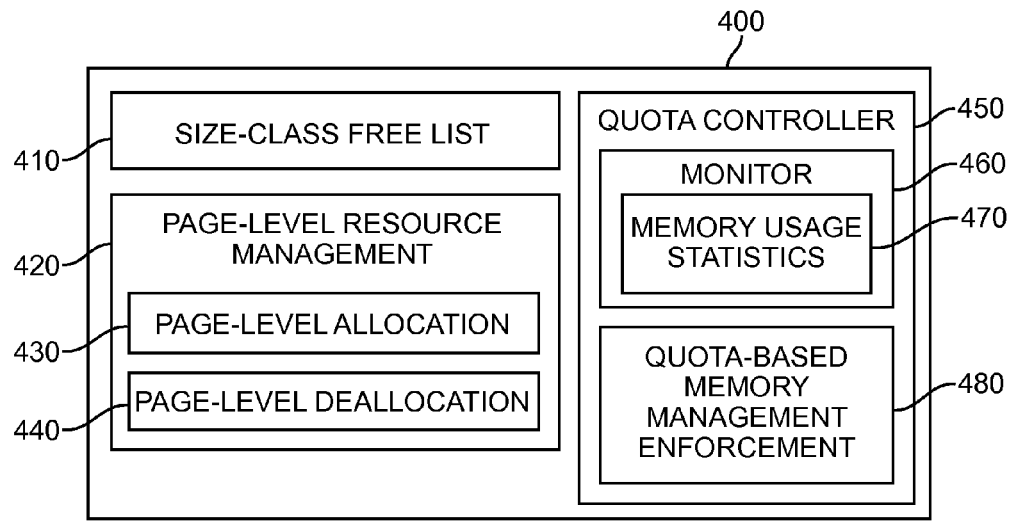
FIG. 7 illustrates an example system-level allocator, in accordance with an embodiment.

FIG. 7 illustrates an example system-level allocator 400, in accordance with an embodiment. A system-level allocator 400 represents a single point of contact between an application 131 and the operating system. In one embodiment, a system-level allocator 400 allocates pages of memory to associated process-level allocators 300 and associated thread-level allocators 250. A page of memory is a 4 KB aligned region of memory.

In one embodiment, a system-level allocator 400 comprises a size-class free list 410, a page-level resource management module 420, and a quota controller 450. A system-level allocator 400 caches memory resources available for allocation for associated process-level allocators 300 and associated thread-level allocators 250 by maintaining a repository of available memory chunks 262 representing large objects in its size-class free list 410. The memory chunks 262 are arranged in lists 411, wherein each list 411 corresponds to a particular large object size class representing a particular allocation size for a large object. In one embodiment, each list 411 is a linked list of memory chunks 262 having a particular allocation size for a large object. In one embodiment, the smallest permitted large object size-class in the size-class free list 410 is 1-page.

The page-level resource management module 420 comprises a page-level allocation unit 430 and a page-level deallocation unit 440. The page-level allocation unit 430 handles each large object allocation request from each associated thread-level allocator 250 and each associated process-level allocator 300. Specifically, the page-level allocation unit 430 determines whether a memory chunk 262 satisfying a large object allocation request from an associated thread-level allocator 250/process-level allocator 300 is available in the size-class free list 410. If a memory chunk 262 satisfying the request is available in the size-class free list 410, the page-level allocation unit 430 provides the available memory chunk 262 to the associated thread-level allocator 250/process-level allocator 300.

The page-level deallocation unit 440 manages each large object deallocation request from each associated thread-level allocator 250 and each associated process-level allocator 300. Specifically, the page-level deallocation unit 440 caches a large object freed by an associated thread-level allocator 250/process-level allocator 300 in the size-class free list 410.

In one embodiment, the page-level resource management module 420 manages page-level allocation and page-level deallocation during an initialization stage. In the initialization stage, the page-level resource management module 420 supplies sufficient pages of memory to each associated process-level allocator 300 for resource caching. The amount of resources a process-level allocator 300 caches is configurable, and the cached resources are shared between all associated thread-level allocators 250.

Each application 131 can only access memory resources that are within a corresponding memory resource quota $M_{quota}$ for the application 131. In one embodiment, a corresponding memory resource quota $M_{quota}$ for an application 131 may be equal to a system memory size of the system 200. Dynamic renegotiation may be used to increase or decrease a corresponding memory resource quota $M_{quota}$ for an application 131 during run-time.

The quota controller 450 comprises a quota-based memory management enforcement unit 480 and a monitor unit 460. The quota-based memory management enforcement unit 480 securely enforces quota-based memory management, thereby preventing different application processes from interfering with one another. The monitor unit 460 monitors real-time/run-time resource usage statistics 470 for a corresponding application 131, thereby facilitating run-time adaptation of resource balancing policy in an associated process-level allocator 300 by passing the real-time/run-time resource usage statistics to the process-level allocator 300.

The quota controller 450 also updates a memory resource quota $M_{quota}$ and a memory resource allocation $M_{allocated}$ for a corresponding application 131. For example, the quota controller 450 updates the memory resource quota $M_{quota}$ when it changes. As another example, the quota controller 450 updates the memory resource allocation $M_{allocated}$ when pages of memory are allocated from the system-level allocator 400 to an associated thread-level allocator 250/process-level allocator 300 or returned from an associated thread-level allocator 250/process-level allocator 300 to the system-level allocator 400. By monitoring the memory resource quota $M_{quota}$ and the memory resource allocation $M_{allocated}$, the system-level allocator 400 is aware of the current memory usage percentage $U_0$ for the corresponding application 131 on-the-fly.

The system-level allocator 400 enforces the quota-based memory management by denying all excessive resource allocation requests from associated thread-level allocators 250 and associated process-level allocators 300. Thus, one application 131 is unable to interrupt the execution of another application 131 (e.g., by launching a denial-of-service attack at will).

In another embodiment, the amount of memory transferred from a process-level allocator 300 to an associated thread-level allocator 250 or a system-level allocator 400 to an associated process-level allocator 300 during a resource-rich application state is based on the history of memory requests instead of a pre-defined capacity. This provides resource-hungry threads 133 with more memory in an efficient manner.

Figure 8:
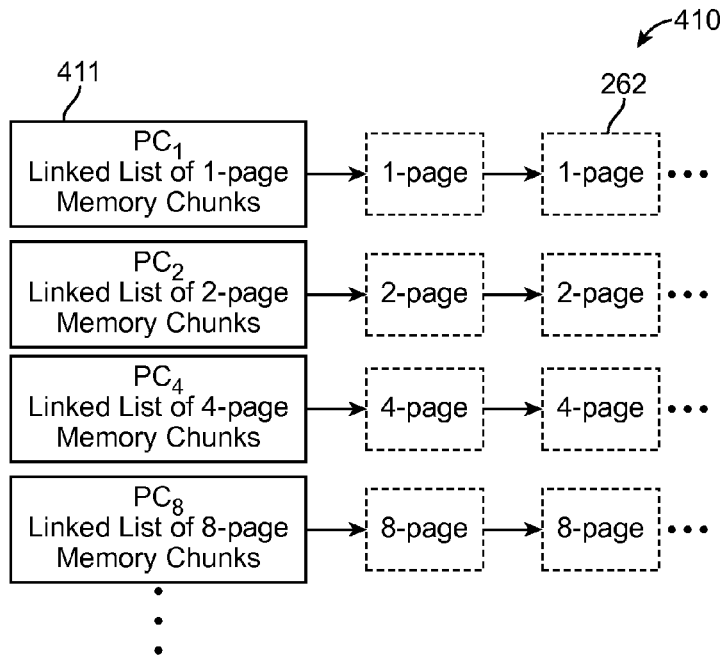
FIG. 8 illustrates an example size-class free list maintained by a system-level allocator, in accordance with an embodiment.

FIG. 8 illustrates an example size-class free list 410 maintained by a system-level allocator 400, in accordance with an embodiment. In one embodiment, the size-class free list 410 maintains one or more lists 411, wherein each list 411 corresponds to a particular size class for a large object.

In one embodiment, each large object size class represents at least one page of memory. A list 411 corresponding to size-class $PC_n$ comprises a singly-linked list of available memory chunks 262, wherein each memory chunk 262 is n-page in size, and wherein n is an integer. For example, as shown in FIG. 8, the size-class free list 410 includes a first list 411 corresponding to size-class $PC_1$ comprising a singly-linked list of available 1-page memory chunks 262, a second list 411 corresponding to size-class $PC_2$ comprising a singly-linked list of available 2-page memory chunks 262, a third list 411 corresponding to size-class $PC_4$ comprising a singly-linked list of available 4-page memory chunks 262, a fourth list 411 corresponding to size-class $PC_8$ comprising a singly-linked list of available 8-page memory chunks 262, etc.

Table 6 below provides example pseudo code for handling a large object allocation request in a system-level allocator 400.

TABLE 6

```
void* malloc_large_object (size_t x) {
    int m = calculate_page_numbers(x);
    int n = calculate_size_class(m);
    while (n<=MAX_SIZE) {
        if there is free chunk on list n {
            get the address of the first chunk p;
            distribute the remaining pages (2^n-m);
            return p;
        } else {
            n++; // go to the next size-class list
        }
    }
    return NULL;
}
```

Table 7 below provides example pseudo code for handling a large object deallocation request in a system-level allocator 400.

TABLE 7

```
void free_large_object(void * p) {
    size_t block_size = get_block_size(p);
    int m = calculate_page_numbers(block_size);
    int n = calculate_size_class(m);
    while (m>0) {
        if (2^n == m) {
```

TABLE 7-continued

```
                insert m pages to the size-class n free
        list;
                check coalescence;
                return;
            } else {
                insert 2^(n-1) pages to the size-class (n-1)
        free list;
                check coalescence;
                m = m-2^(n-1);
                n = calculate_size_class(m);
            }
        }
        return;
}
```

In one embodiment, each memory resource to be allocated/deallocated is preceded by a header tag comprising header information. Header information may include data such as an object type (Object Type) identifying a type of resource (e.g., a small object or a large object), a thread identifier (Thread ID) identifying a thread that the resource is to be allocated to/deallocated from, and a block size indicating a size of the resource (Block Size).

Figure 9:
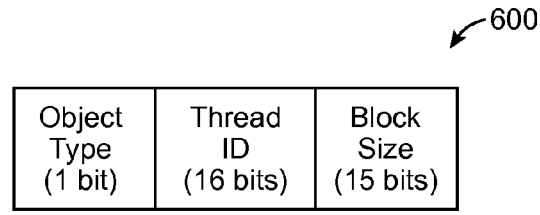
FIG. 9 shows an example header tag for a small object, in accordance with an embodiment.

FIG. 9 shows an example header tag 600 for a small object, in accordance with an embodiment. In one embodiment, the header tag 600 for a small object is only 4-bytes in length. Specifically, the object type comprises 1 bit of data, the thread identifier comprises 16 bits of data, and the block size comprises 15 bits of data. In one embodiment, the system 200 supports $2^{16}$ threads in parallel.

If the resource to be allocated/deallocated is a small object, the object type is set to '0'. If the resource to be allocated/deallocated is a large object, the object type is set to '1'.

Figure 10:
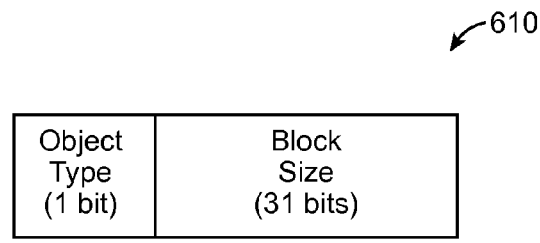
FIG. 10 shows an example header tag for a large object, in accordance with an embodiment.

FIG. 10 shows an example header tag 610 for a large object, in accordance with an embodiment. In one embodiment, the header tag 610 for a large object is only 4-bytes in length. Specifically, the object type comprises 1 bit of data, and the block size comprises 31 bits of data. Therefore, the largest permitted size for a large object is 2 GB.

In another embodiment, an integer number indicating a number of pages the large object represents is used in lieu of a block size in the header tag 610, thereby extending the largest permitted size for a large object to $2^{31}$ pages.

Figure 11:
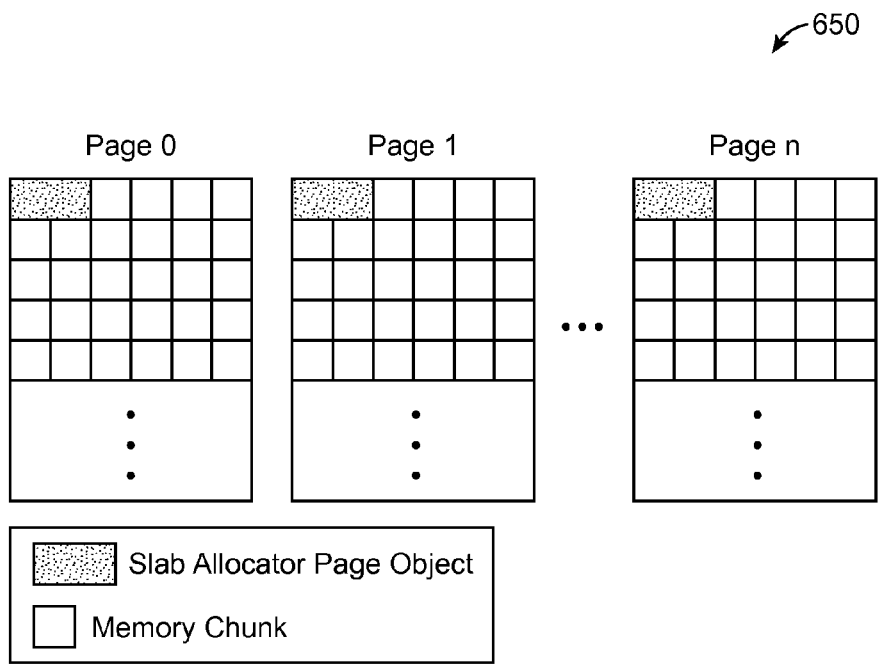
FIG. 11 shows an example slab allocator system, in accordance with an embodiment.

FIG. 11 shows an example slab allocator system 650, in accordance with an embodiment. The slab allocator system 650 is used to dynamically create and delete memory chunks.

In one embodiment, a slab allocator page object is assigned n physical pages for storing memory chunks, wherein n is a positive integer. Each page is managed by a corresponding slab allocator page object. As shown in FIG. 11, a slab allocator page object is self-contained within a page that corresponds to it. In one embodiment, a slab allocator page object occupies the first 64 bytes of a corresponding page.

A slab allocator page object manages memory chunk allocation and deallocation in a corresponding page. Remaining space in a page is evenly divided into multiple pieces, wherein each piece represents a memory chunk. Each memory chunk maintains a starting address of a memory block it represents, such that there is a one-to-one mapping between a memory chunk and a memory block. In one embodiment, a simple bitmap may be used to manage all memory chunks within a page as the sizes of the memory chunks are fixed. The number of bits in the bitmap depends on the number of memory chunks in the page. For each bit in the bitmap, a '1' bit indicates that a corresponding memory chunk has been allocated, while a '0' bit indicates that a corresponding memory chunk is available.

When a hierarchical heap allocator system 200 creates a new memory chunk, the slab allocator system 650 finds a slab allocator page object having a corresponding page that includes available memory chunks by determining the first '0' bit in a bitmap of the slap allocator page object. If there is an available memory chunk, an available memory chunk is returned. If there are no available memory chunks in any page, the slab allocator system 650 requests for more pages.

When the heap allocator system 200 deletes a memory chunk, the slab allocator system 650 checks the address of the memory chunk to determine which slab allocator page object is responsible for reclaiming the memory chunk. The slab allocator page object responsible for reclaiming the memory chunk is then called to place the memory chunk into its proper position in a corresponding page.

Table 8 below provides example data structure for a slab allocator page object.

TABLE 8

```
int bitmap[MWORD]
int max_object;
T object[0];
bool is_in_range(T*);
T* alloc( );
void free(T*);
```

Table 9 below provides example data structure for a memory chunk.

TABLE 9

```
void* ptr;
void set_ptr(char*);
char* ptr( );
mword_t val( );
```

Figure 12:
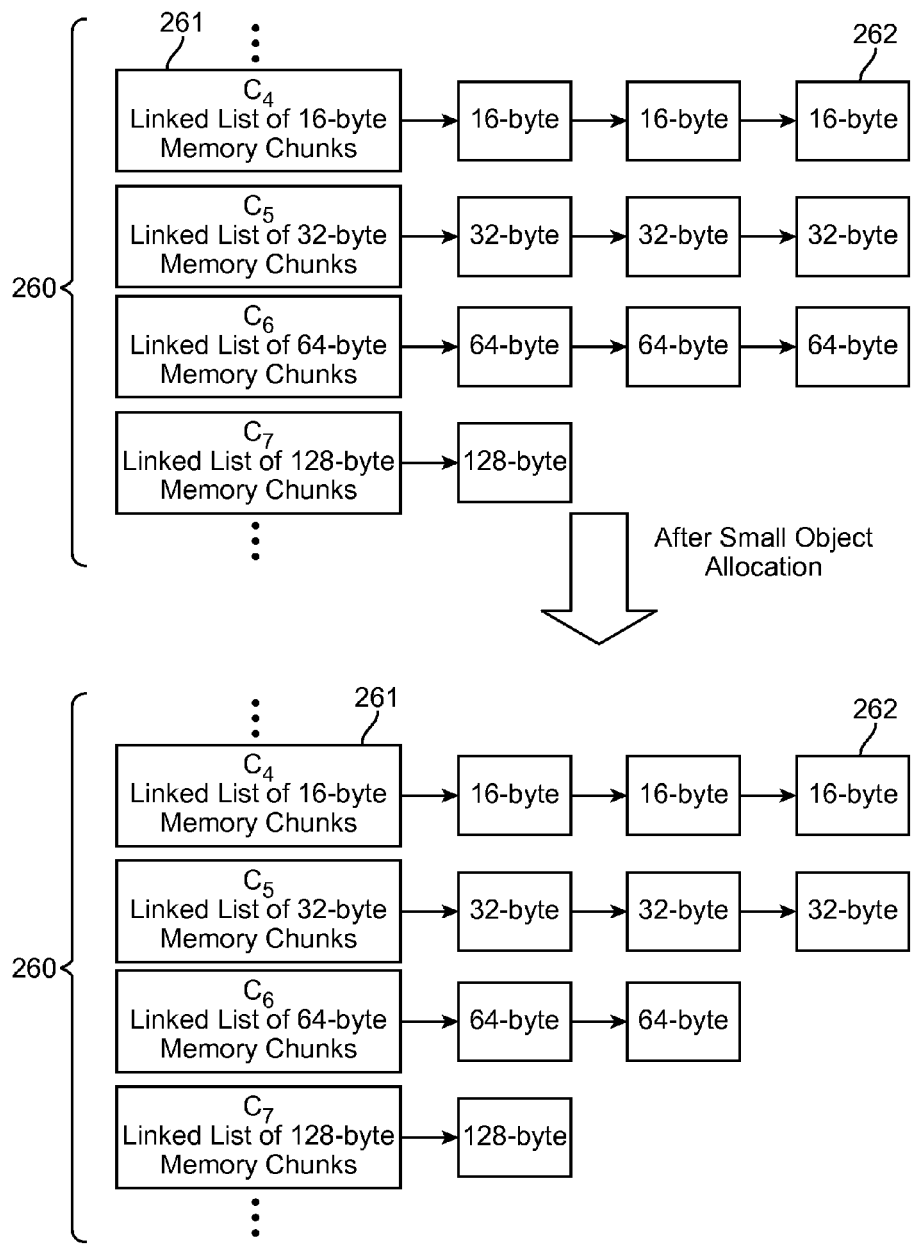
FIG. 12 illustrates an example small object allocation locally handled by a thread-level allocator, in accordance with an embodiment.

FIG. 12 illustrates an example small object allocation locally handled by a thread-level allocator 250, in accordance with an embodiment. Assume a thread of an application 131 requests an allocation of 48 bytes from a corresponding thread-level allocator 250. The thread-level allocator 250 determines a size-class by rounding up the size 48 bytes to a nearest size that is an exponential of 2. As 64 bytes is the nearest size that is an exponential of 2, the thread-level allocator 250 then locates, in its size-class free list 260, a list 261 corresponding to size-class $C_6$ that comprises a linked-list of 64-byte memory chunks 262.

As shown in FIG. 12, the list 261 corresponding to size-class $C_6$ comprises three available 64-byte memory chunks 262. The thread-level allocator 250 returns a memory address corresponding to a first available 64-byte memory chunk 262 in the list 261 corresponding to size-class $C_6$, and removes the first available 64-byte memory chunk 262 from the list 261. As shown in FIG. 12, the list 261 corresponding to size-class $C_6$ comprises only two available 64-byte memory chunks 262 after the small object allocation.

Figure 13:
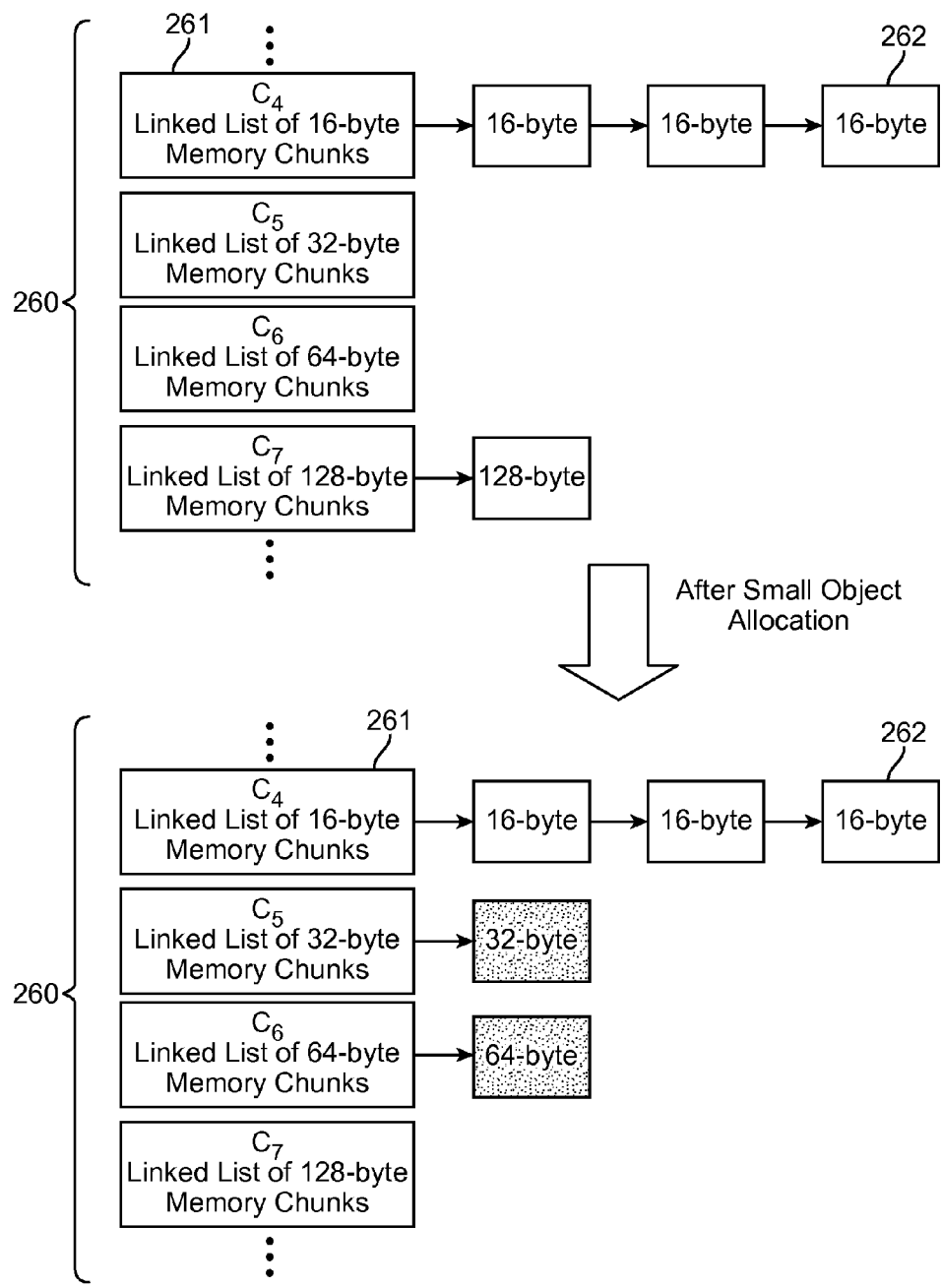
FIG. 13 illustrates another example small object allocation locally handled by a thread-level allocator, in accordance with an embodiment.

FIG. 13 illustrates another example small object allocation locally handled by a thread-level allocator 250, in accordance with an embodiment. Assume a thread of an application 131 requests an allocation of 32 bytes from a corresponding thread-level allocator 250. The thread-level allocator 250 determines a size-class by rounding up the size 32 bytes to a nearest size that is an exponential of 2. As 32 bytes is the nearest size that is an exponential of 2, the thread-level allocator 250 then locates, in its size-class free list 260, a list 261 corresponding to size-class $C_5$ that comprises a linked-list of 32-byte memory chunks 262.

As shown in FIG. 13, the list 261 corresponding to size-class $C_5$ comprises no available 32-byte memory chunks 262. The thread-level allocator 250 reiterates through each succeeding list 261 (e.g., the list 261 corresponding to size-class $C_6$, the list 261 corresponding to size-class $C_7$, etc.) in its size-class free list 260 until it locates a list 261 with available memory chunks.

As shown in FIG. 13, the list 261 corresponding to size-class $C_6$ comprises no available 64-byte memory chunks 262, but the list 261 corresponding to size-class $C_7$ comprises one available 128-byte memory chunk 262. The thread-level allocator 250 returns a memory address corresponding to the available 128-byte memory chunk 262 in the list 261 corresponding to size-class $C_7$ to the thread, and removes the 128-byte memory chunk 262 from the list 261. Further, as the thread only requested 32 bytes, the remaining 96 bytes of the 128-byte memory chunk 262 is distributed between at least one list 261 of the size-class free list 206. For example, as shown in FIG. 13, the remaining 96 bytes of the 128-byte memory chunk 262 is distributed as a 32-byte memory chunk 262 to the list 261 corresponding to size-class $C_5$ and a 64-byte memory chunk 262 to the list 261 corresponding to size-class $C_6$, respectively.

Figure 14:
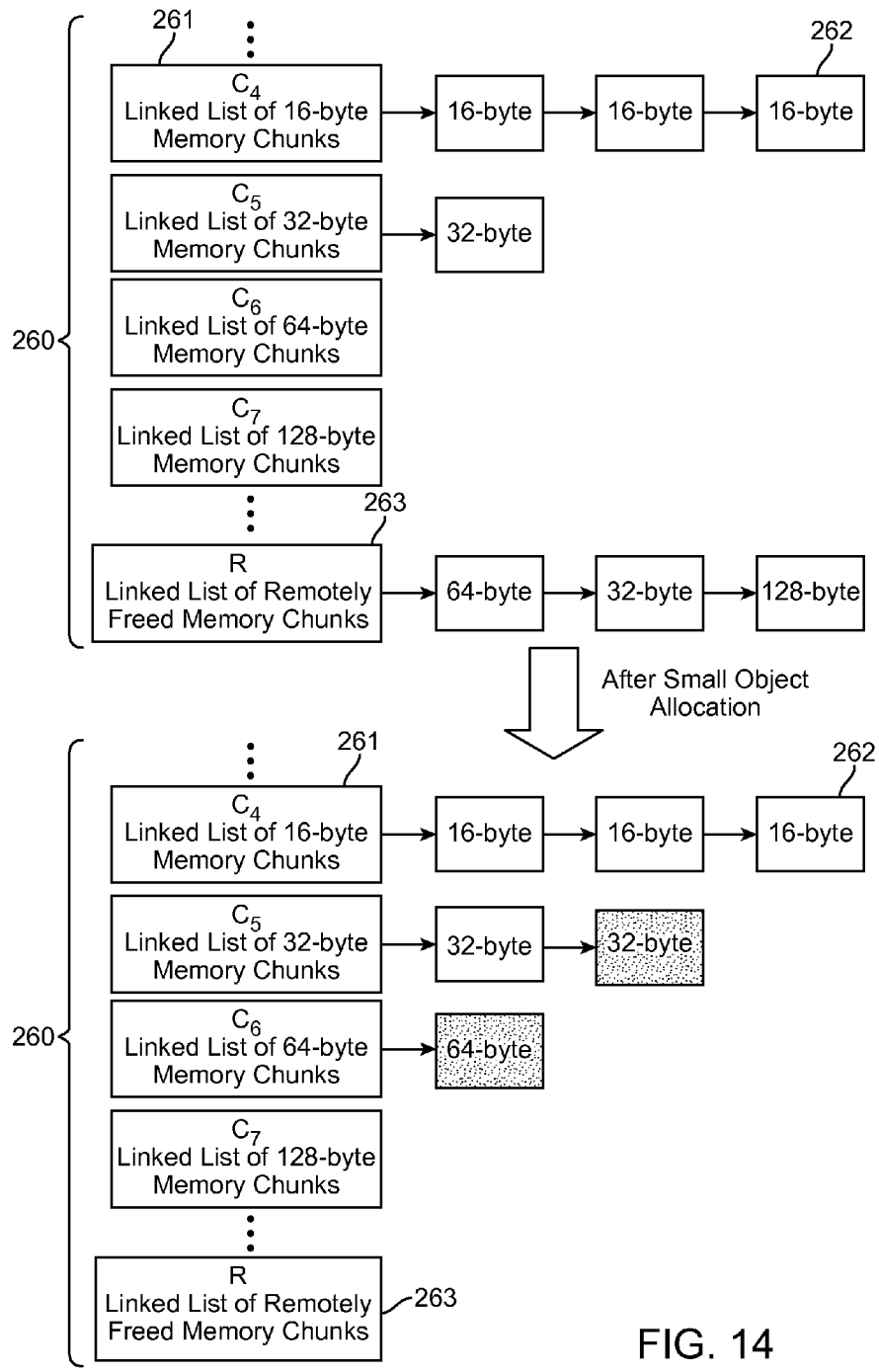
FIG. 14 illustrates another example small object allocation locally handled by a thread-level allocator, in accordance with an embodiment.

FIG. 14 illustrates another example small object allocation locally handled by a thread-level allocator 250, in accordance with an embodiment. Assume a thread of an application 131 requests an allocation of 128 bytes from a corresponding thread-level allocator 250. The thread-level allocator 250 determines a size-class by rounding up the requested size 128 bytes to a nearest size-class that is an exponential of 2. As 128 bytes is the nearest size-class that is an exponential of 2, the thread-level allocator 250 then locates, in its size-class free list 260, a list 261 corresponding to size-class $C_7$ that comprises a linked-list of 128-byte memory chunks 262.

As shown in FIG. 14, the list 261 corresponding to size-class $C_7$ comprises no available 128-byte memory chunks 262. The thread-level allocator 250 attempts to locate an available memory chunk 262 in each succeeding list 261 corresponding to an incremented size-class (e.g., the list 261 corresponding to size-class $C_8$, the list 261 corresponding to size-class $C_9$, etc.) until it locates an available memory chunk. In this example, each succeeding list 261 comprises no available memory chunks 262. When the thread-level allocator 250 determines that even the list 261 corresponding to the largest permitted size-class (i.e., the list 261 corresponding to size-class $C_{15}$) does not have any available memory chunks, the thread-level allocator 250 checks the remotely-freed list 263 for one or more available memory chunks 262 satisfying the requested size 128 bytes.

As shown in FIG. 14, the remotely-freed list 263 comprises three available memory chunks 262: a 64-byte memory chunk 262, a 32-byte memory chunk 262, and a 128-byte memory chunk 262. The thread-level allocator 350 returns a memory address corresponding to the available 128-byte memory chunk 262 in the remotely-freed list 263, and distributes the remaining memory chunks 262 in the remotely-freed list 263 between the lists 261 of its size-free class list 261. For example, as shown in FIG. 14, the 64-byte memory chunk 262 and the 32-byte memory chunk 262 in the remotely-freed list 263 are distributed to the list 261 corresponding to size-class $C_6$ and the list 261 corresponding to size-class $C_5$, respectively.

Figure 15:
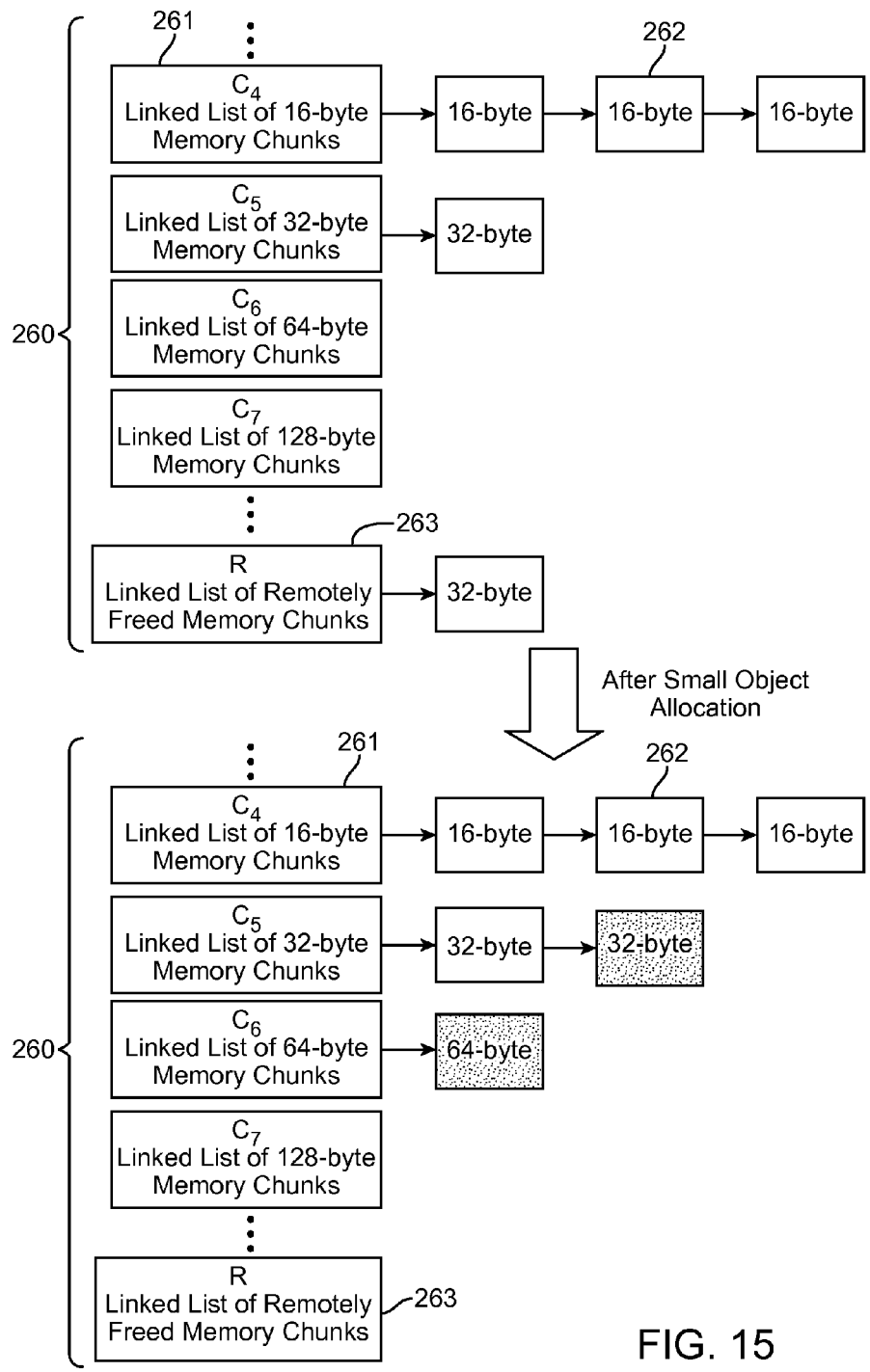
FIG. 15 illustrates an example small object allocation handled by a process-level allocator in response to a small object allocation request from an associated thread-level allocator, in accordance with an embodiment.
Figure 15:
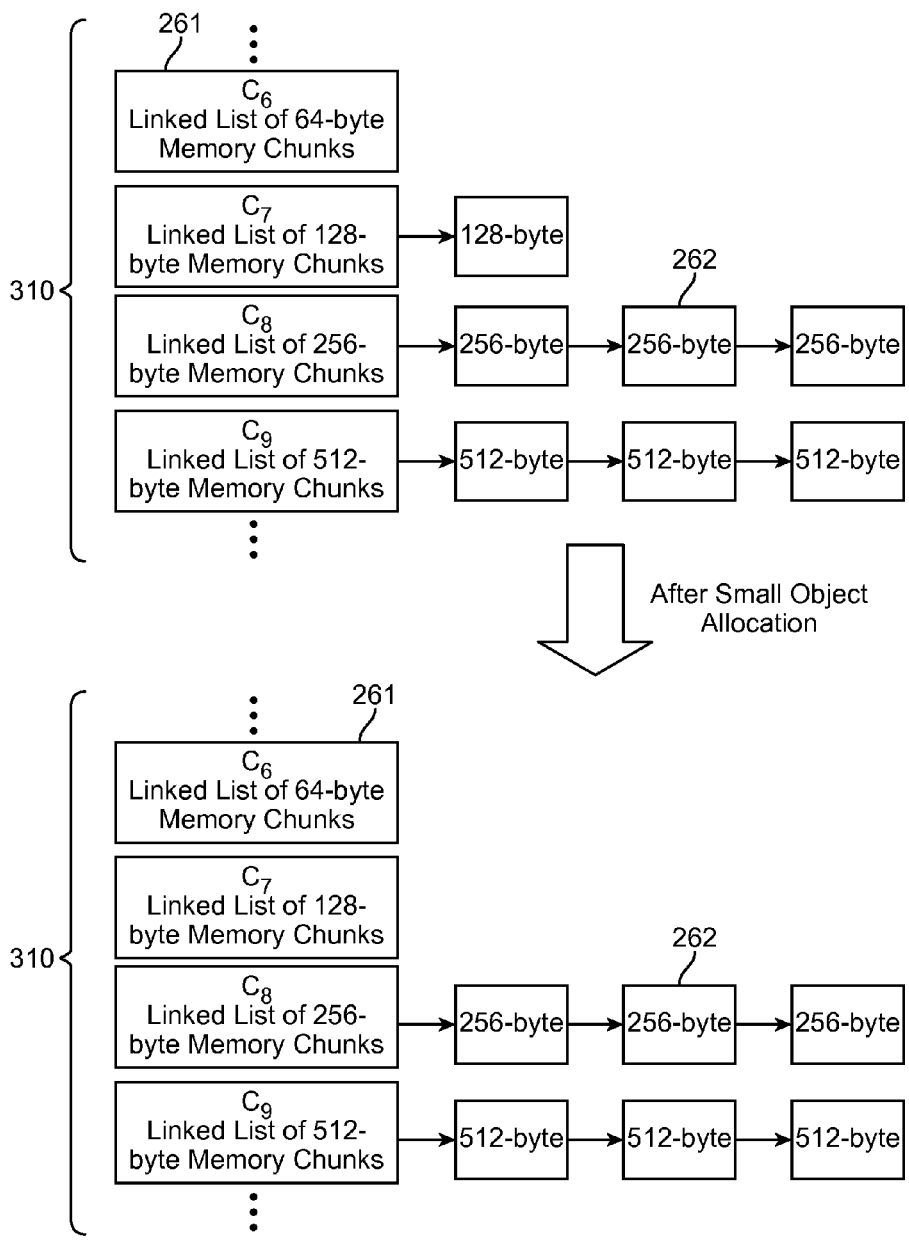

FIG. 15 illustrates an example small object allocation handled by a process-level allocator 300 in response to a small object allocation request from an associated thread-level allocator 250, in accordance with an embodiment. Assume a thread of an application 131 requests an allocation of 64 bytes from a corresponding thread-level allocator 250. The thread-level allocator 250 determines a size-class by rounding up the requested size 64 bytes to a nearest size-class that is an exponential of 2. As 64 bytes is the nearest size-class that is an exponential of 2, the thread-level allocator 250 then locates, in its size-class free list 260, a list 261 corresponding to size-class $C_6$ that comprises a linked-list of 64-byte memory chunks 262.

As shown in FIG. 15, the list 261 corresponding to size-class $C_6$ in the size-class free list 260 comprises no available 64-byte memory chunks 262. The thread-level allocator 250 attempts to locate, in its size-class free list 260, an available memory chunk 262 in each succeeding list 261 corresponding to an incremented size-class (e.g., the list 261 corresponding to size-class $C_7$, the list 261 corresponding to size-class $C_8$, etc.) until it locates an available memory chunk 262. In this example, each succeeding list 261 comprises no available memory chunks 262. When the thread-level allocator 250 determines that even the list 261 corresponding to the largest permitted size-class (i.e., the list 261 corresponding to size-class $C_{15}$) does not have any available memory chunks 262, the thread-level allocator 250 checks the remotely-freed list 263 for one or more available memory chunks 262 satisfying the requested size 64 bytes.

As shown in FIG. 15, the remotely-freed list 263 comprises only an available 32-byte memory chunk 262. The thread-level allocator 350 distributes the 32-byte memory chunk in the remotely-freed list 263 to the list 261 corresponding to size-class $C_5$. As none of the available memory chunks 262 in its size-class free list 260 satisfies the requested size 64 bytes, the thread-level allocator 250 requests 64 bytes from the associated process-level allocator 300 by sending a small object allocation request for 64 bytes to the associated process-level allocator 300.

Upon receiving the small object allocation request for 64 bytes from the associated thread-level allocator 250, the process-level allocator 300 determines a size-class by rounding up the requested size 64 bytes to a nearest size-class that is an exponential of 2. As 64 bytes is the nearest size-class that is an exponential of 2, the process-level allocator 300 then locates, in its size-class free list 310, a list 261 corresponding to size-class $C_6$ that comprises a linked-list of 64-byte memory chunks 262.

As shown in FIG. 15, the list 261 corresponding to size-class $C_6$ in the size-class free list 310 comprises no available 64-byte memory chunks 262. The process-level allocator 300 attempts to locate, in its size-class free list 310, an available memory chunk 262 in each succeeding list 261 corresponding to an incremented size-class (e.g., the list 261 corresponding to size-class $C_7$, the list 261 corresponding to size-class $C_8$, etc.) until it locates an available memory chunk 262. In this example, the list 261 corresponding to size-class $C_7$ in the size-class free list 310 comprises one available 128-byte memory chunk 262. The process-level allocator 300 provides the available 128-byte memory chunk 262 to the associated thread-level allocator 250, and removes the 128-byte memory chunk 262 from the list 261 corresponding to size-class $C_7$ in the size-class free list 310.

Upon receiving the 128-byte memory chunk 262 from the process-level allocator 300, the thread-level allocator 250 returns a memory address corresponding to the available 128-byte memory chunk 262 to the thread. As the thread only requested 64 bytes, the thread-level allocator 250 distributes the remaining 64 bytes of the available 128-byte memory chunk 262 to the list 261 corresponding to size-class $C_6$.

Figure 16:
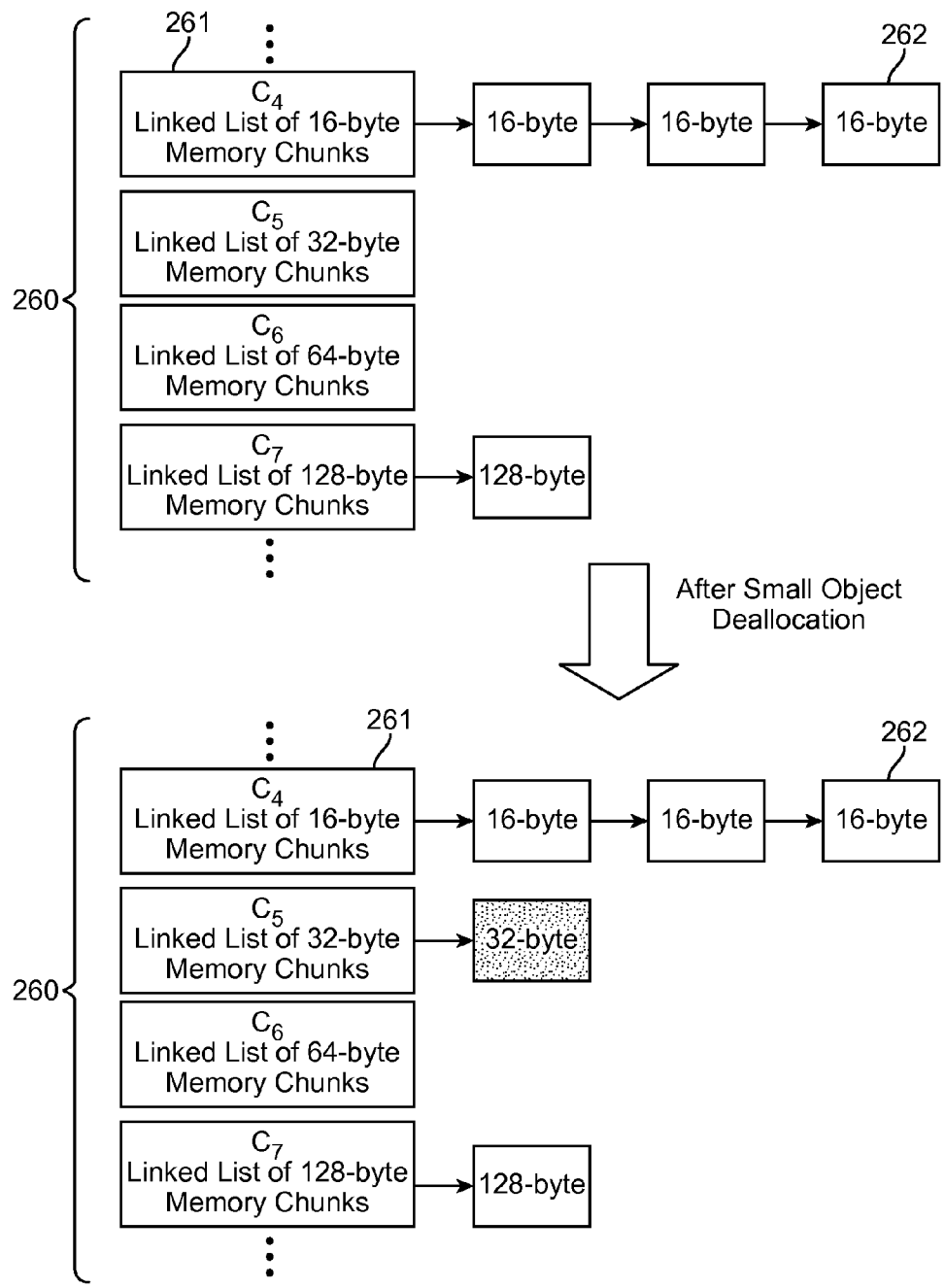
FIG. 16 illustrates an example small object deallocation locally handled by a thread-level allocator, in accordance with an embodiment.

FIG. 16 illustrates an example small object deallocation locally handled by a thread-level allocator 250, in accordance with an embodiment. Assume a thread of an application 131 sends a small object deallocation request to a corresponding thread-level allocator 250, requesting deallocation of a 32-byte memory chunk 262 that was previously allocated to the thread. Based on a header tag 600 of the 32-byte memory chunk 262, the thread-level allocator 250 determines a thread identifier and a block size of the 32-byte memory chunk 262. The thread identifier identifies a thread that the 32-byte memory chunk 262 was previously allocated to.

If the thread identifier matches a thread identifier of the thread that the thread-level allocator 250 corresponds to, the thread-level allocator 250 determines a size-class by rounding up the block size 32 bytes to a nearest size that is an exponential of 2. As 32 bytes is the nearest size that is an exponential of 2, the thread-level allocator 250 then locates, in its size-class free list 260, a list 261 corresponding to size-class $C_5$ that comprises a linked-list of 32-byte memory chunks 262. As shown in FIG. 16, the thread-level allocator 250 inserts the 32-byte memory chunk into the list 261 corresponding to size-class $C_5$.

Figure 17:
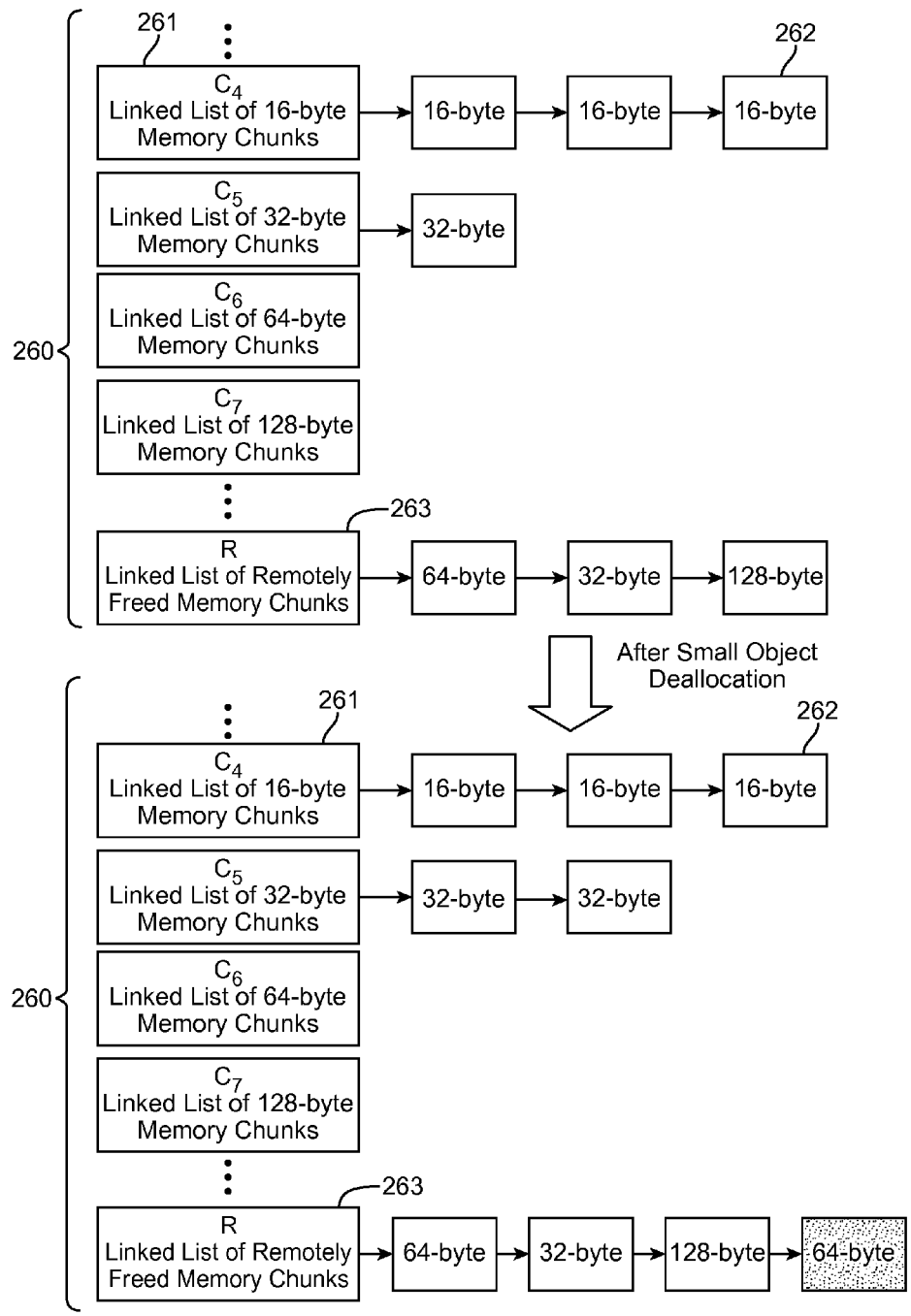
FIG. 17 illustrates an example small object deallocation remotely handled by a thread-level allocator, in accordance with an embodiment.

FIG. 17 illustrates an example small object deallocation remotely handled by a thread-level allocator 250, in accordance with an embodiment. Assume a thread-level allocator 250 receives a small object deallocation request for a 64-byte memory chunk 262 that was previously allocated to a thread that does not correspond to the thread-level allocator 250. Based on a header tag 600 of the 64-byte memory chunk 262, the thread-level allocator 250 determines a thread identifier and a block size of the 64-byte memory chunk 262. As the thread identifier does not match a thread identifier of the thread that the thread-level allocator 250 corresponds to, the thread-level allocator 250 locates a remotely-freed list 263 of a thread having a thread identifier matching the thread identifier in the header tag 600 of the 64-byte memory chunk 262. As shown in FIG. 17, the thread-level allocator 250 inserts the 64-byte memory chunk into the remotely-freed list 263 of the thread having the thread identifier matching the thread identifier in the header tag 600 of the 64-byte memory chunk 262.

Figure 18:
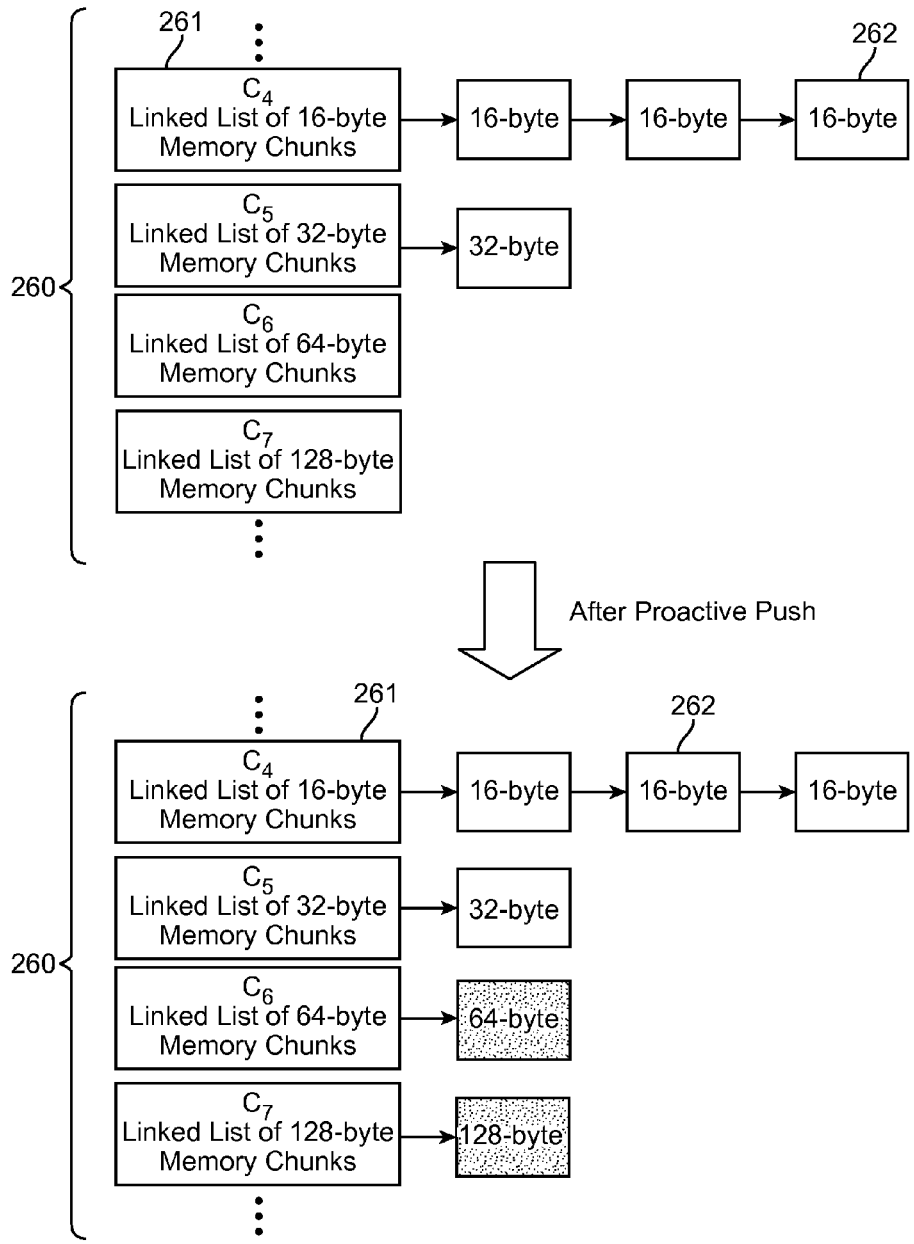
FIG. 18 illustrates an example of a proactive small object allocation handled by a process-level allocator implementing active resource balancing policy, in accordance with an embodiment.
Figure 18:
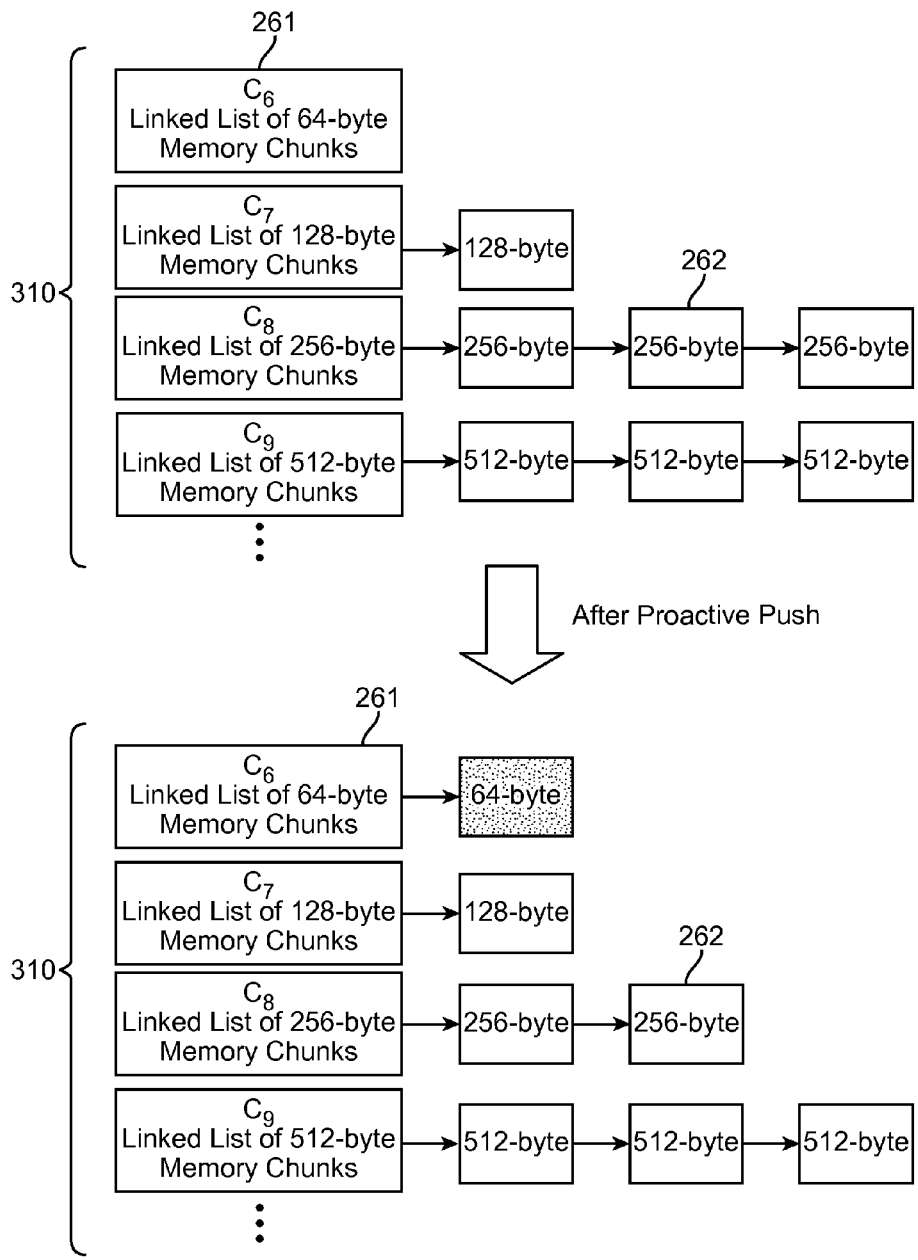

FIG. 18 illustrates an example of a proactive small object allocation handled by a process-level allocator 300 implementing active resource balancing policy, in accordance with an embodiment. As stated above, a process-level allocator 300 implements an active resource balancing policy if the process-level allocator 300 determines that a corresponding application 131 has a resource-rich application state. Assume that an associated thread-level allocator 250 is running low on resources and requires an additional 192 bytes of memory to meet a corresponding resource caching capacity $Q_T$. Under the active resource balancing policy, the process-level allocator 300 proactively pushes available resources from its size-class free list 310 to the associated thread-level allocator 250.

Specifically, the process-level allocator 300 determines a size-class by rounding up the 192 bytes required to a nearest size-class that is an exponential of 2. As 256 bytes is the nearest size-class that is an exponential of 2, the process-level allocator 300 then locates, in its size-class free list 310, a list 261 corresponding to size-class $C_8$ that comprises a linked-list of 256-byte memory chunks 262.

As shown in FIG. 18, the list 261 corresponding to size-class $C_8$ in the size-class free list 310 comprises three available 256-byte memory chunks 262. As the associated thread-level allocator 250 only requires 192 bytes of memory, the process-level allocator 300 provides the associated thread-level allocator 250 with the required 192 bytes from a first available 256-byte memory chunk 262 the list 261 corresponding to size-class $C_8$ in the size-class free list 310.

The process-level allocator 300 provides the required 192 bytes to the associated thread-level allocator 250 as one 64-byte memory chunk 262 and one 128-byte memory chunk 262. As shown in FIG. 18, the associated thread-level allocator 250 caches, in its size-class free list 260, the 64-byte memory chunk 262 and the 128-byte memory chunk 262 received in the list 261 corresponding to size-class $C_6$ and the list 261 corresponding to size-class $C_7$, respectively. The process-level allocator 300 then distributes the remaining 64 bytes of the first available 256-byte memory chunk 262 to the list 261 corresponding to size-class $C_6$ in its size-class free list 310.

Figure 19:
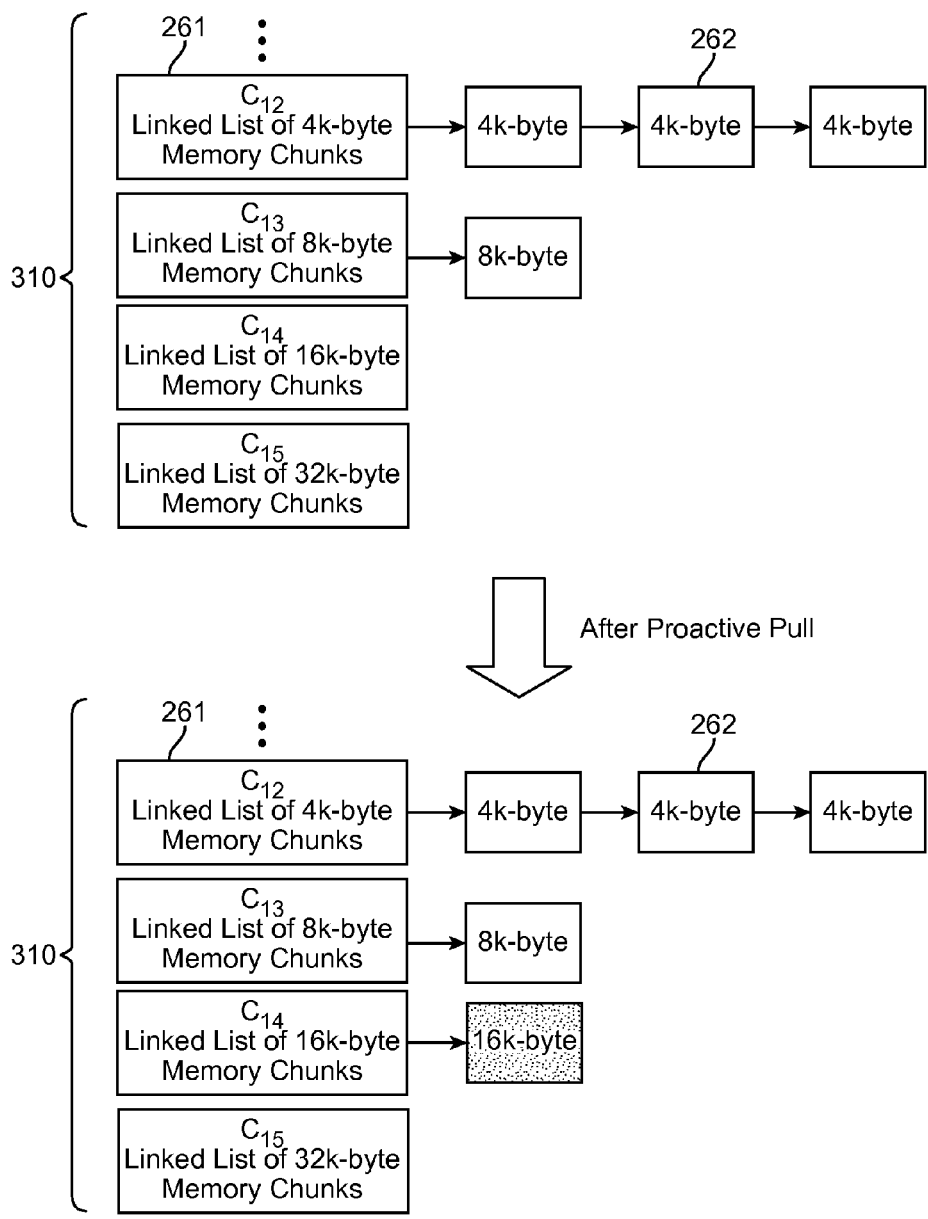
FIG. 19 illustrates an example of a proactive large object allocation handled by a process-level allocator implementing active resource balancing policy, in accordance with an embodiment.
Figure 19:
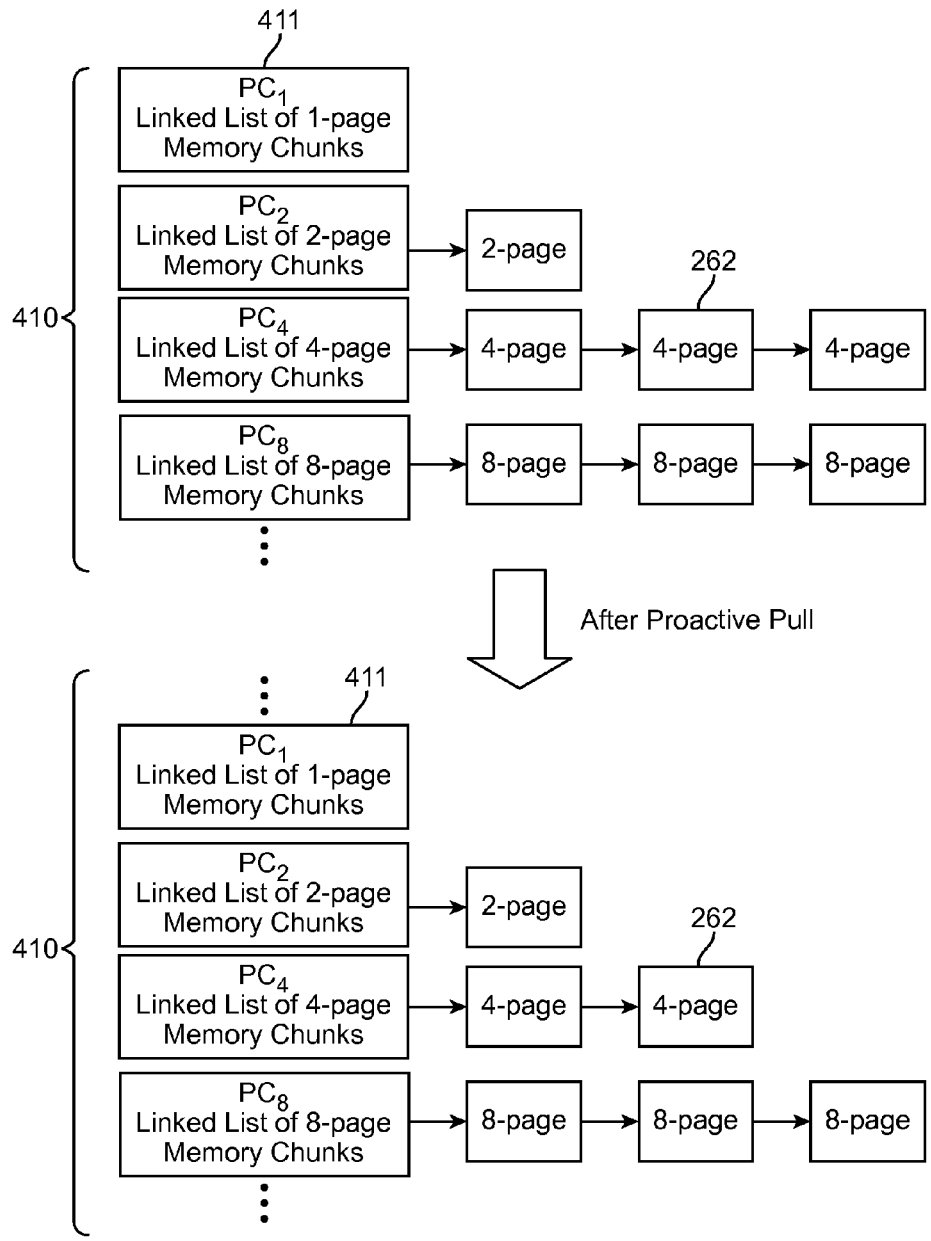

FIG. 19 illustrates an example of a proactive large object allocation handled by a process-level allocator 300 implementing active resource balancing policy, in accordance with an embodiment. Assume that a process-level allocator 300 is running low on resources and requires an additional 16 KB (i.e., 4 pages) of memory to meet a corresponding resource caching capacity $Q_P$. Under the active resource balancing policy, the process-level allocator 300 proactively pulls available resources from an associated system-level allocator 400 to its size-class free list 310.

Specifically, the process-level allocator 300 determines a size-class by rounding up the required 4 pages of memory to the nearest permitted size-class for a large object. As 4 pages of memory is a permitted size-class, the process-level allocator 300 then locates, in a size-class free list 410 of the associated system-level allocator 400, a list 411 corresponding to size-class $PC_4$ that comprises a linked-list of 4-page memory chunks 262.

As shown in FIG. 19, the list 411 corresponding to size-class $PC_4$ in the size-class free list 410 comprises three available 4-page memory chunks 262. The process-level allocator 300 pulls a first available 4-page memory chunk 262 from the list 411 corresponding to size-class $PC_4$ to its size-class free list 310. As shown in FIG. 19, the process-level allocator 300 caches, in its size-class free list 310, the 4-page memory chunk 262 pulled as a 16K-byte memory chunk 262 in the list 261 corresponding to size-class $C_{14}$.

Figure 20:
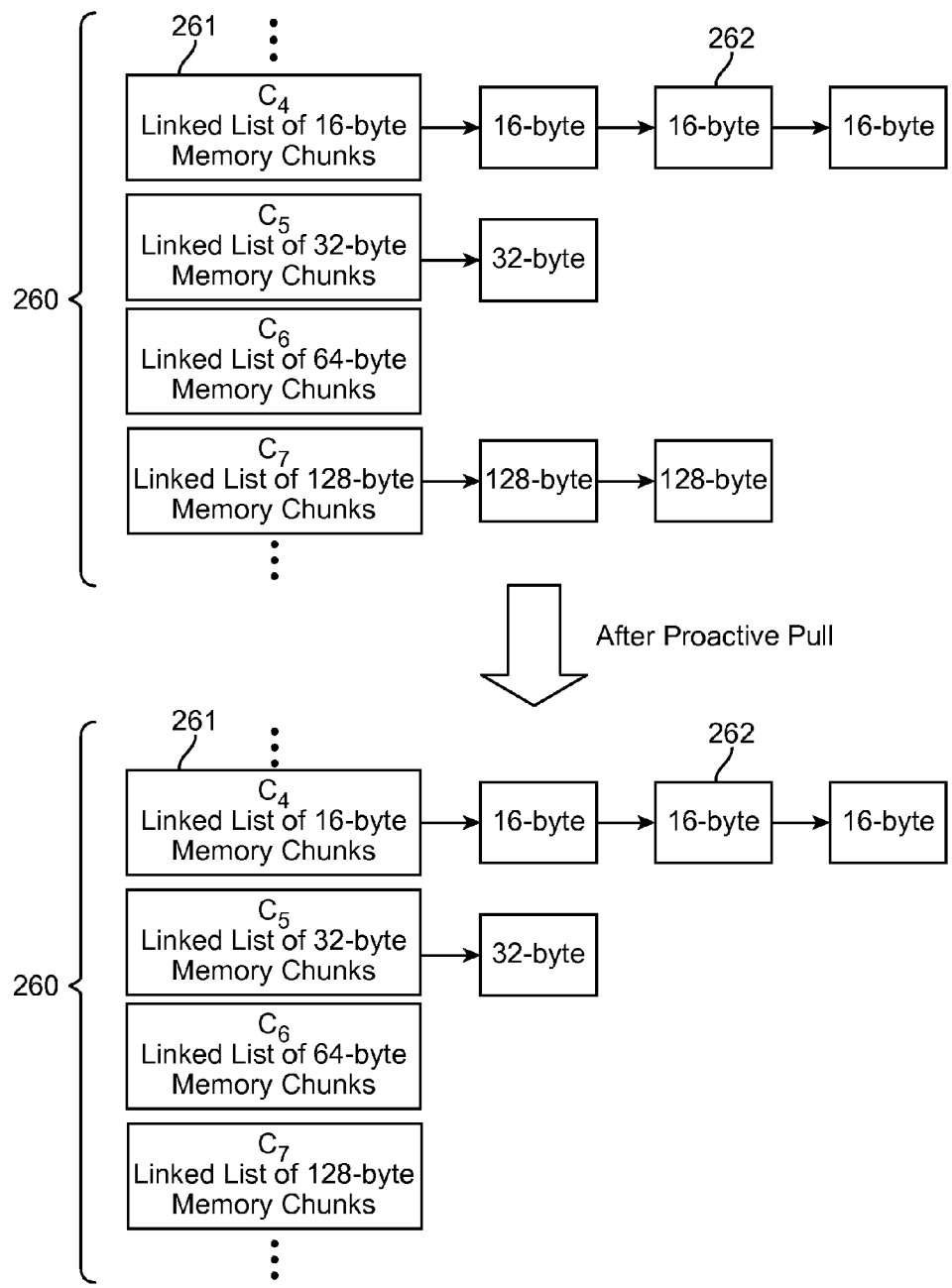
FIG. 20 illustrates an example of proactive small object deallocation handled by a process-level allocator implementing a passive resource balancing policy, in accordance with an embodiment.
Figure 20:
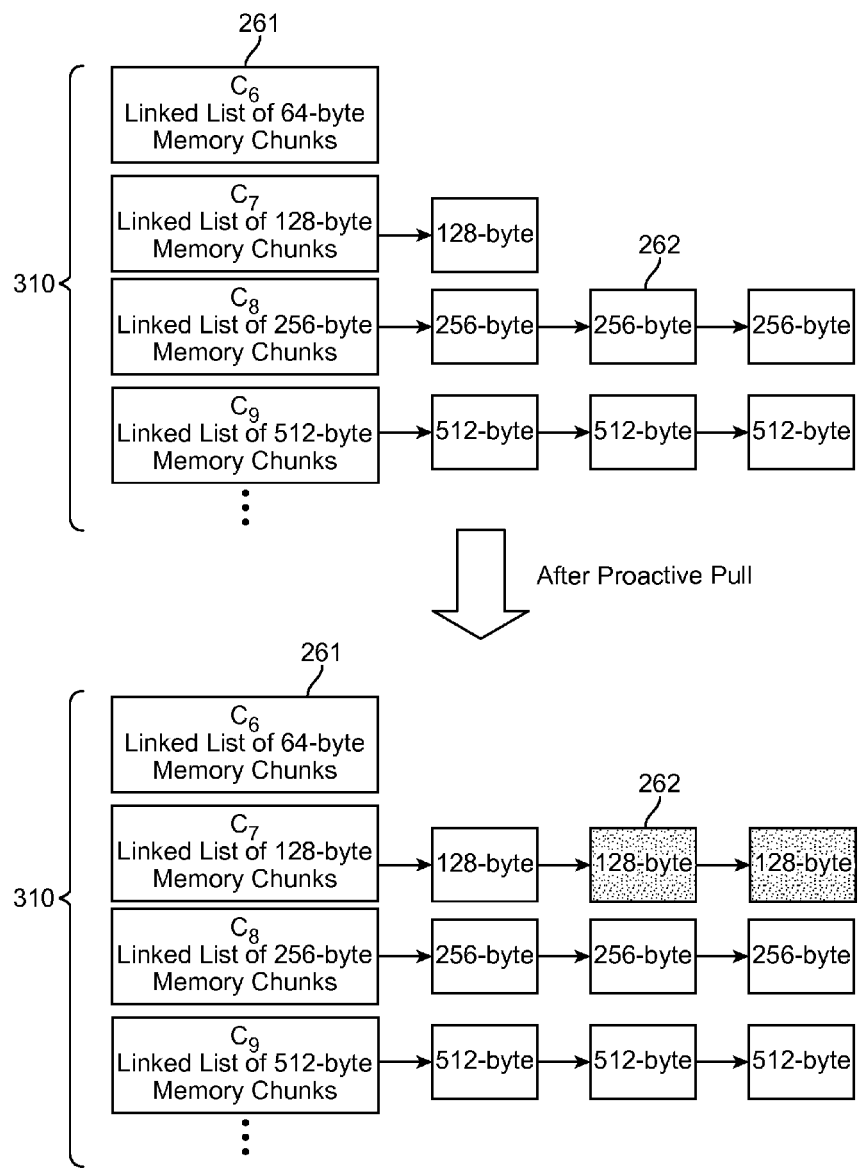

FIG. 20 illustrates an example of proactive small object deallocation handled by a process-level allocator 300 implementing a passive resource balancing policy, in accordance with an embodiment. As stated above, a process-level allocator 300 implements a passive resource balancing policy if the process-level allocator 300 determines that a corresponding application 131 has a resource-scarce application state. Assume that an associated thread-level allocator 250 is caching 256 bytes of memory in excess of a corresponding resource caching capacity $Q_T$. Under the passive resource balancing policy, the process-level allocator 300 proactively pulls the excess 256 bytes from the associated thread-level allocator 250 to its size-class free list 310.

Specifically, the process-level allocator 300 determines a size-class by rounding up the excess 256 bytes to the nearest permitted size-class for a small object. As 256 bytes is a nearest permitted size-class, the process-level allocator 300 then locates, in the size-class free list 260 of the associated thread-level allocator 250, a list 261 corresponding to size-class $C_8$ that comprises a linked-list of 256-byte memory chunks 262. The list 261 corresponding to size-class $C_8$ in the size-class free list 260, however, comprises no available 256-byte memory chunks 262.

As the list 261 corresponding to size-class $C_7$ in the size-class free list 260 comprises two available 128-byte memory chunks 262, the process-level allocator 300 pulls the two 128-byte memory chunks 262 to its own size-class free list 310. As shown in FIG. 20, the process-level allocator 300 inserts the two 128-byte memory chunks 262 pulled into the list 261 corresponding to size-class $C_7$ in its size-class free list 310.

Figure 21:
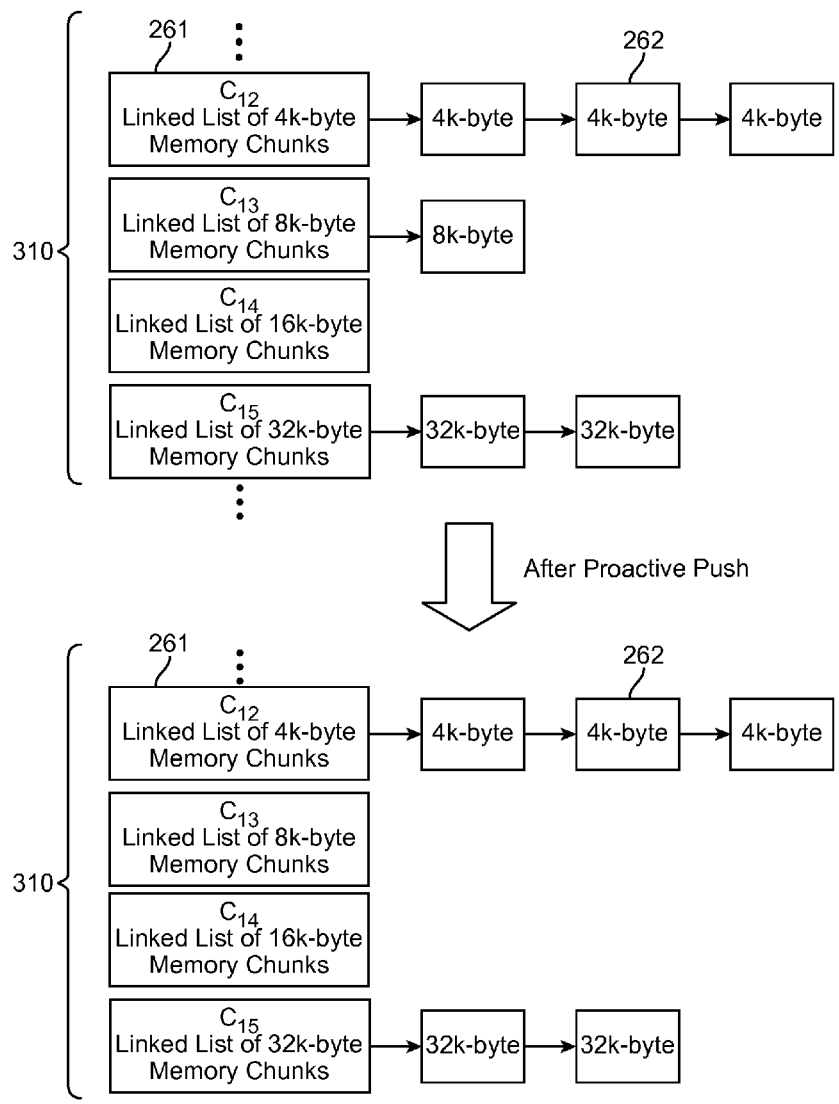
FIG. 21 illustrates an example of proactive small object deallocation handled by a process-level allocator implementing passive resource balancing policy, in accordance with an embodiment.
Figure 21:
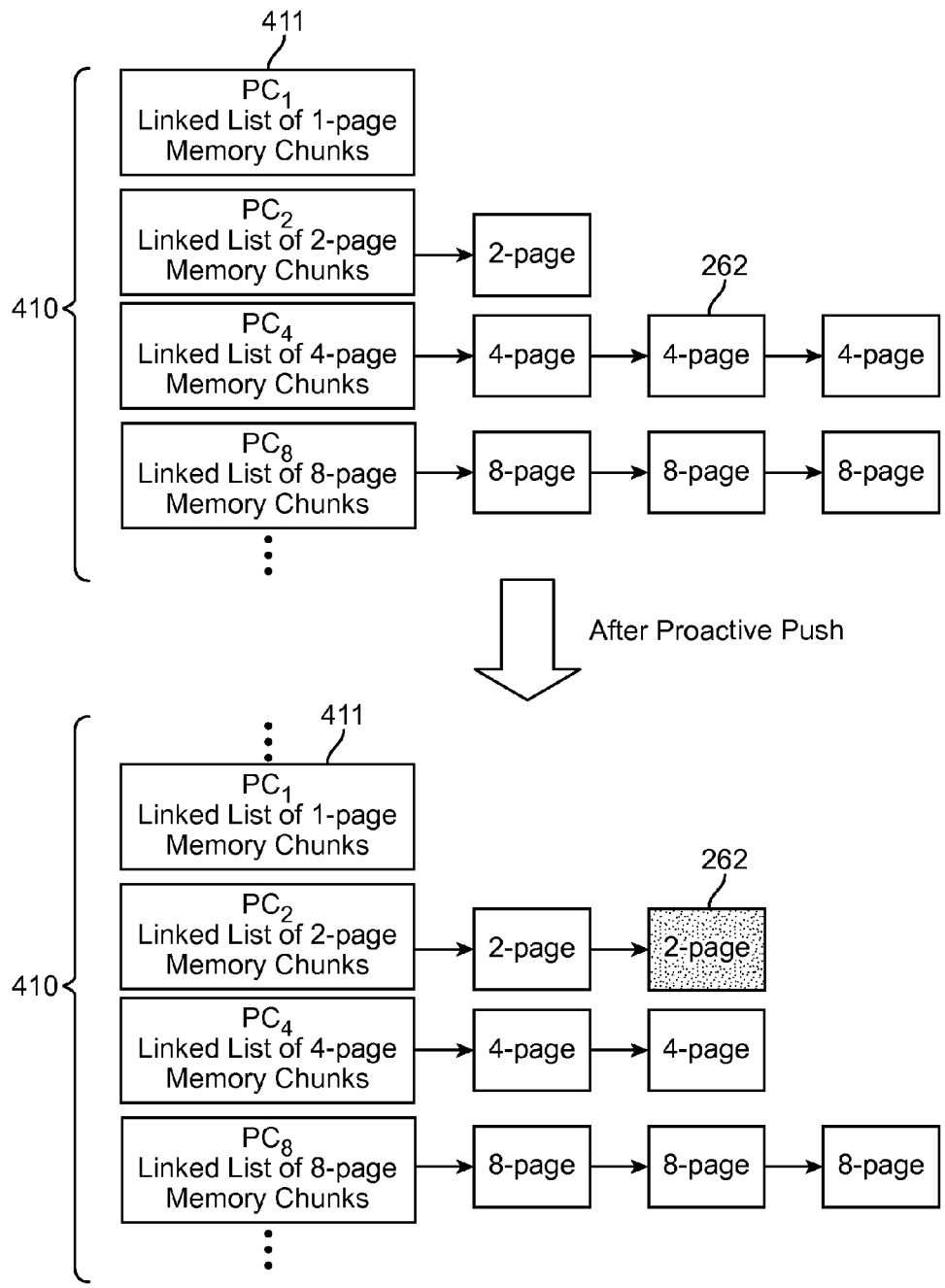

FIG. 21 illustrates an example of proactive small object deallocation handled by a process-level allocator 300 implementing passive resource balancing policy, in accordance with an embodiment. Assume that a process-level allocator 300 is caching 8K bytes of memory in excess of a corresponding resource caching capacity $Q_P$. Under the passive resource balancing policy, the process-level allocator 300 proactively pushes the excess 8K bytes from its size-class free list 310 to an associated system-level allocator 400.

Specifically, the process-level allocator 300 determines a size-class by rounding up the excess 8K bytes to the nearest permitted size-class for a large object. As excess 8K bytes is a permitted size-class for a large object, the process-level allocator 300 locates, in its size-class free list 310, a list 261 corresponding to size-class $C_{13}$ that comprises a linked-list of 8K-byte memory chunks 262.

As shown in FIG. 21, the list 261 corresponding to size-class $C_{13}$ in the size-class free list 310 comprises one available 8K-byte memory chunk 262. The process-level allocator 300 pushes the 8K-byte memory chunk 262 to the associated system-level allocator 400, and removes the 8K-byte memory chunk 262 from the list 261 corresponding to size-class $C_{13}$ in its size-class free list 310.

As shown in FIG. 21, the system-level allocator 400 inserts the 8K-byte memory chunk 262 as a 2-page memory chunk 262 in the list 411 corresponding to size-class $PC_2$ in its size-class free list 410.

Figure 22:
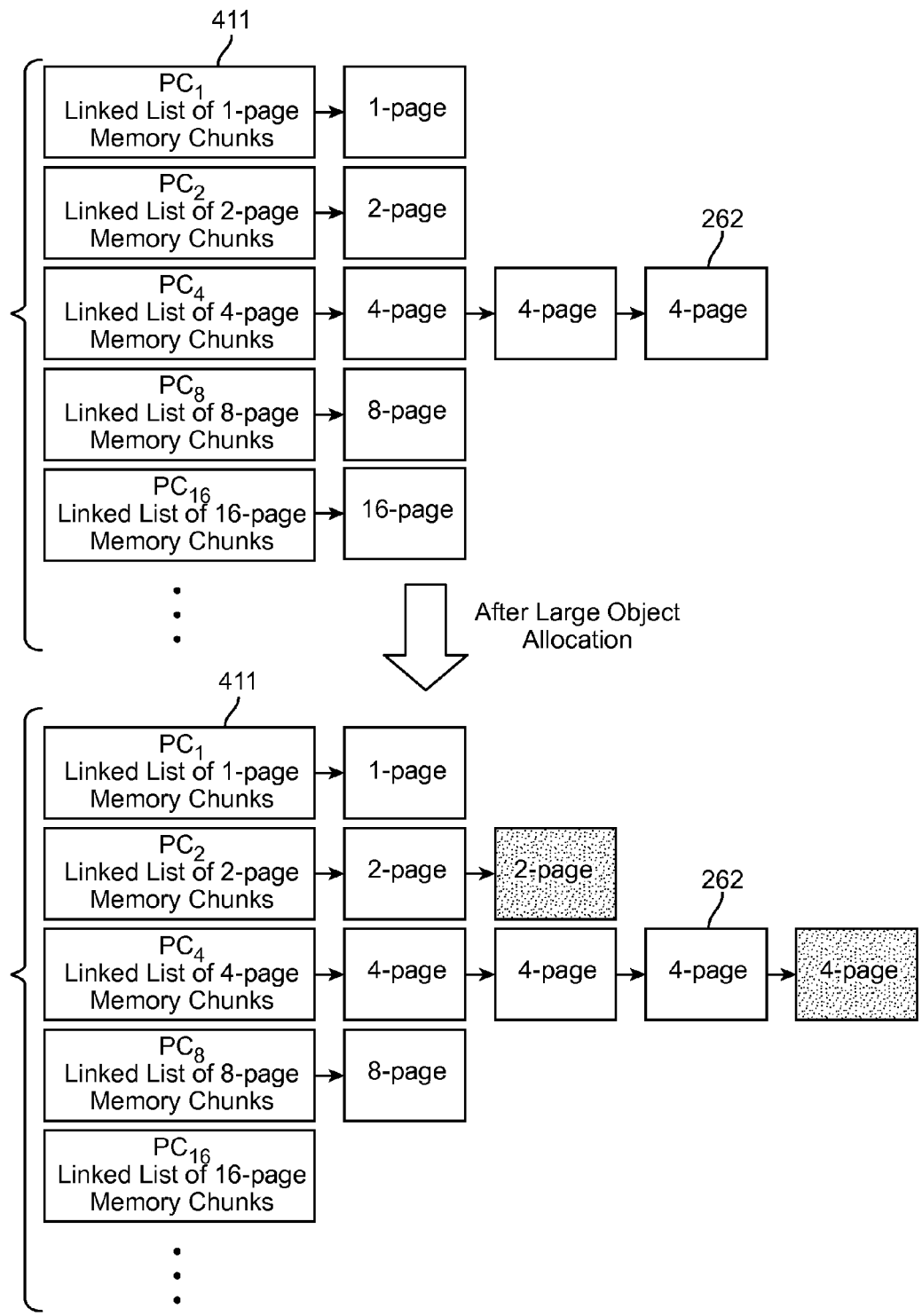
FIG. 22 illustrates an example large object allocation handled by a system-level allocator in response to a large object allocation request from an associated thread-level allocator, in accordance with an embodiment.

FIG. 22 illustrates an example large object allocation handled by a system-level allocator 400 in response to a large object allocation request from an associated thread-level allocator 250, in accordance with an embodiment. Assume a system-level allocator 400 receives a large object allocation request for 40K bytes (i.e. 10 pages) of memory from an associated thread-level allocator 250. The system-level allocator 400 determines the nearest permitted size-class for a large object that will satisfy the requested 10 pages of memory. As 16-page is the nearest permitted size-class for a large object that will satisfy the requested 10 pages of memory, the system-level allocator 400 then locates, in its size-class free list 410, a list 411 corresponding to size-class $PC_{16}$ that comprises a linked-list of 16-page memory chunks 262.

As shown in FIG. 22, the list 411 corresponding to size-class $PC_{16}$ comprises one available 16-page memory chunk 262. As the associated thread-level allocator 250 only requested 10 pages of memory, the process-level allocator 400 returns a memory address corresponding to the 16-page memory chunk 262 to the thread-level allocator 250, and distributes the remaining 6 pages of memory between the lists 411 of its size-free class list 410. For example, as shown in FIG. 22, a 2-page memory chunk 262 and a 4-page memory chunk 262 are distributed to the list 411 corresponding to size-class $PC_2$ and the list 261 corresponding to size-class $PC_4$, respectively.

Figure 23:
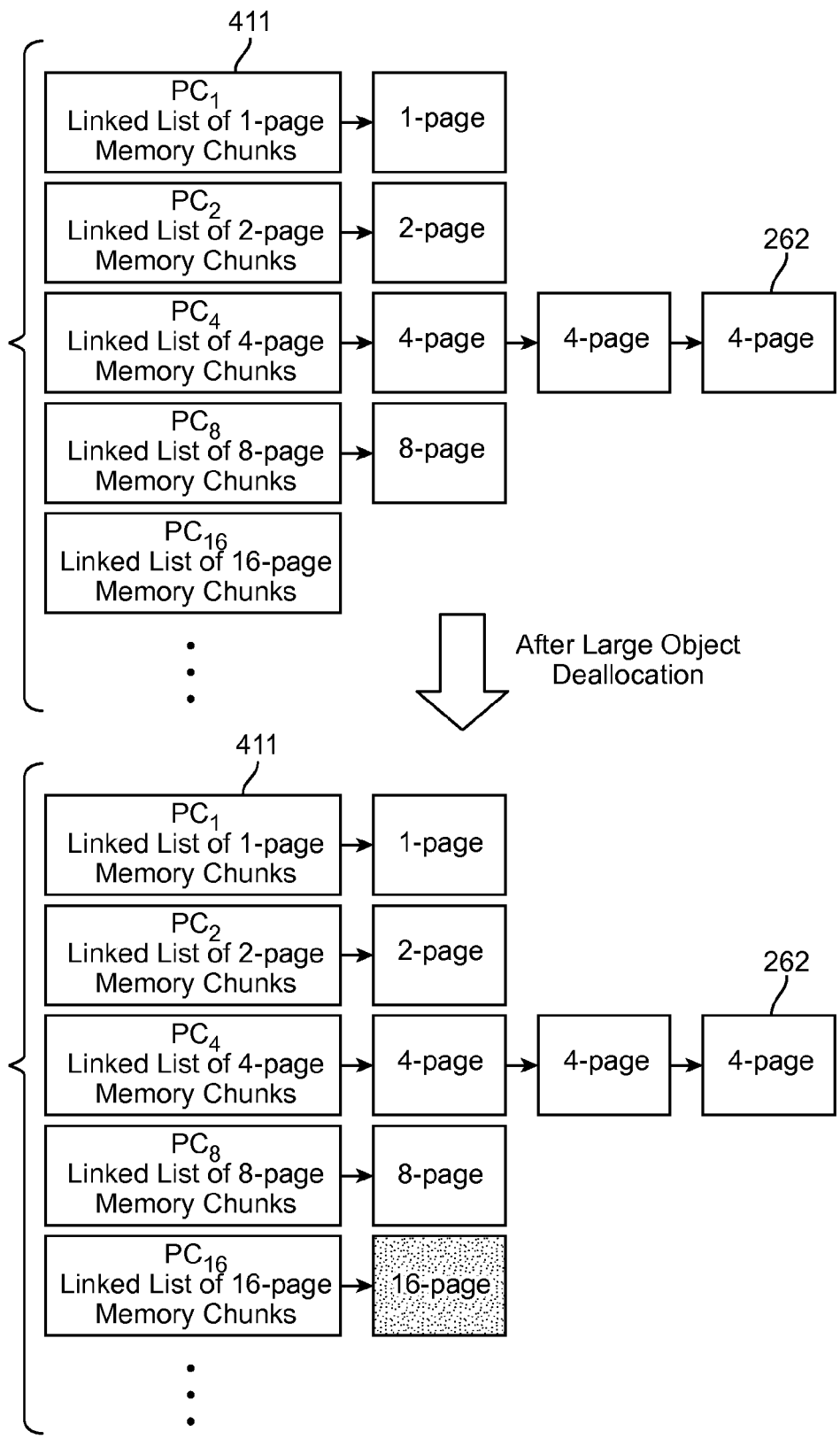
FIG. 23 illustrates an example large object deallocation handled by a system-level allocator in response to a large object deallocation request from an associated thread-level allocator, in accordance with an embodiment.

FIG. 23 illustrates an example large object deallocation handled by a system-level allocator 400 in response to a large object deallocation request from an associated thread-level allocator 250, in accordance with an embodiment. Assume a system-level allocator 400 receives, from an associated thread-level allocator 250, a large object deallocation request for a 16-page memory chunk 262 that was previously allocated to the thread-level allocator 250. Based on a header tag 600 of the 16-page memory chunk 262, the system-level allocator 400 determines an object type and a block size of the 16-page memory chunk 262. As the object type is a large object, the system-level allocator 400 determines the nearest permitted large object size-class for the 16-page memory chunk 262. As 16-page is the nearest permitted large object size-class, the system-level allocator 250 locates, in its size-class free list 410, a list 411 corresponding to size-class $PC_{16}$ that comprises a linked-list of 16-page memory chunks 262. As shown in FIG. 23, the system-level allocator 400 inserts the freed 16-page memory chunk 262 into the list 411 corresponding to size-class $PC_{16}$.

Figure 24:
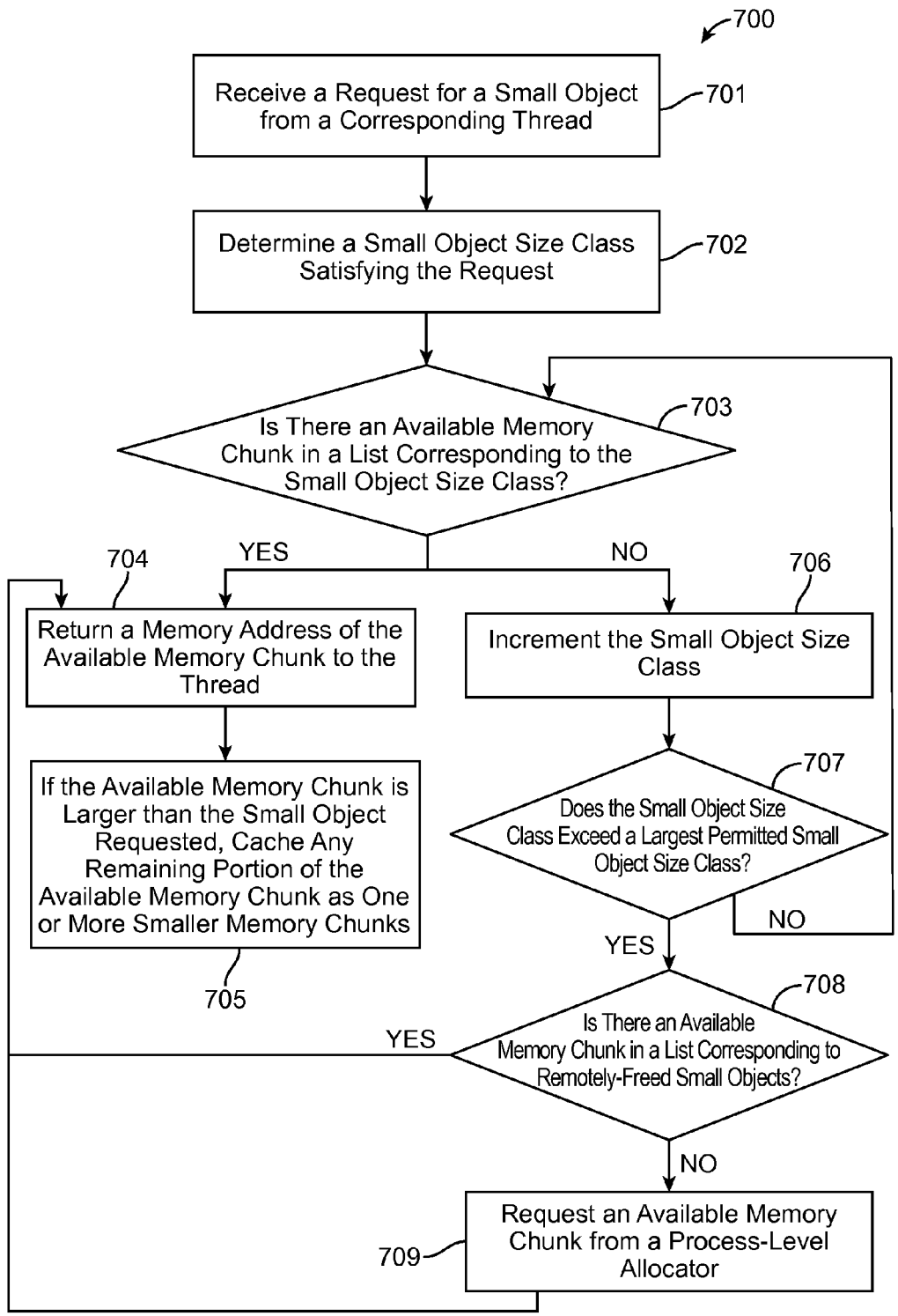
FIG. 24 illustrates an example flow chart for implementing small object allocation in a thread-level allocator, in accordance with an embodiment.

FIG. 24 illustrates an example flow chart 700 for implementing small object allocation in a thread-level allocator 250, in accordance with an embodiment. In process block 701, receive a request for a small object from a corresponding application thread. In process block 702, determine a small object size class satisfying the request. In process block 703, determine if there is an available memory chunk in a list corresponding to the small object size class. If there is an available memory chunk, proceed to process block 704. In process block 704, return a memory address of the available memory chunk to the thread. In process block 705, cache any remaining portion of the available memory chunk as one or more smaller memory chunks if the available memory chunk is larger than the small object requested.

If there is no available memory chunk, proceed to process block 706 wherein the small object size class is incremented. In process block 707, determine if the small object size class exceeds a largest permitted small object size class. If the small object size class does not exceed the largest permitted small object size class, return to process block 703. If the small object size class exceeds the largest permitted small object size class, proceed to process block 708.

In process block 708, determine if there is an available memory chunk in a list corresponding to remotely-freed small objects. If there is an available memory chunk in the list corresponding to remotely-freed small objects, proceed to process block 704. If there is no available memory chunk in the list corresponding to remotely-freed small objects, proceed to process block 709. In process block 709, request an available memory chunk from a process-level allocator 300, and proceed to process block 704.

Figure 25:
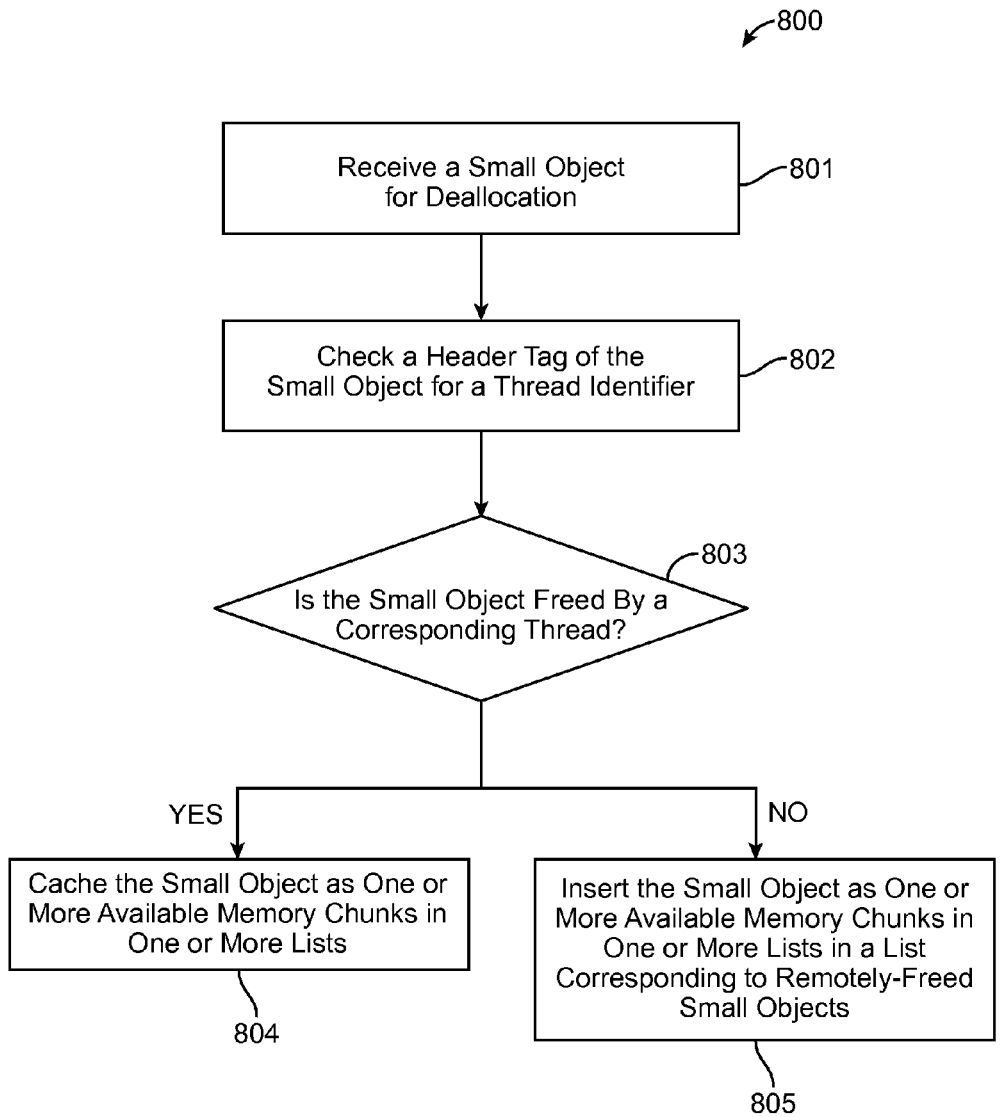
FIG. 25 illustrates an example flow chart for implementing small object deallocation in a thread-level allocator, in accordance with an embodiment.

FIG. 25 illustrates an example flow chart 800 for implementing small object deallocation in a thread-level allocator 250, in accordance with an embodiment. In process block 801, receive a small object for deallocation. In process block 802, check a header tag of the small object for a thread identifier. In process block 803, determine if the small object is freed by a corresponding application thread. If the small object is freed by a corresponding application thread, proceed to process block 804. In process block 804, cache the small object as one or more available memory chunks in one or more lists.

If the small object is not freed by a corresponding application thread, proceed to process block 805. In process block 805, insert the small object as one or more available memory chunks in a list corresponding to remotely-freed small objects.

Figure 26:
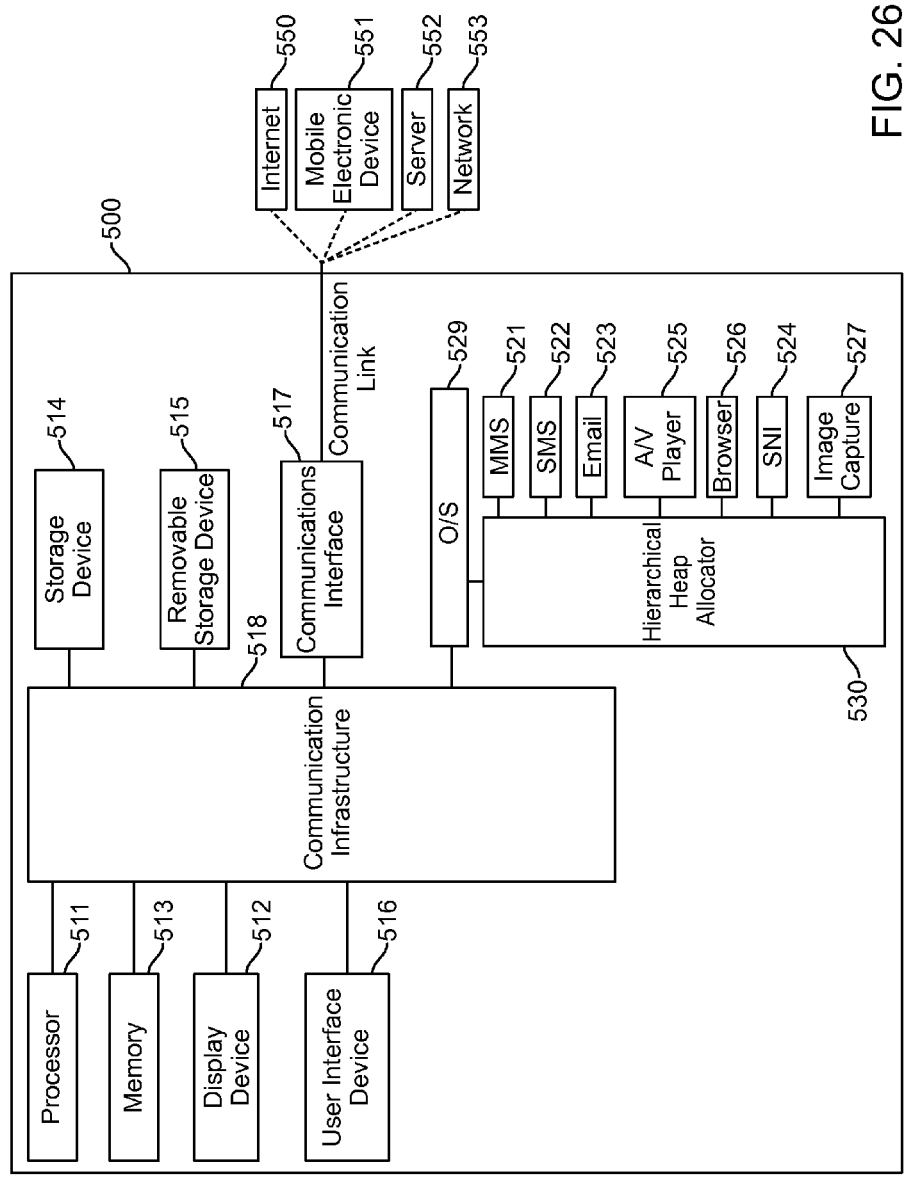
FIG. 26 is a high-level block diagram showing an information processing system comprising a computing system implementing an embodiment.

FIG. 26 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices and/or networks, such as the Internet 550, a mobile electronic device 551, a server 552, and a network 553. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

The system 500 may further include application modules as MMS module 521, SMS module 522, email module 523, social network interface (SNI) module 524, audio/video (AV) player 525, web browser 526, image capture module 527, etc.

The system 500 further includes a hierarchical heap allocator 530 as described herein, according to an embodiment. In one embodiment, the automated security policy generation system 530 along with an operating system 529 may be implemented as executable code residing in a memory of the system 500. In another embodiment, the automated security policy generation system 530 along with the operating system 529 may be implemented in firmware.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the one or more embodiments have been described with reference to certain versions thereof; however, other versions are possible. Therefore, the spirit and scope of the appended claims should not be limited to the description of the preferred versions contained herein.

What is claimed is:

1. A hierarchical heap allocator system, comprising:
at least one processor; and
a non-transitory processor-readable memory device storing instructions that when executed by said at least one processor causes said at least one processor to perform operations including:
caching multiple sets of memory resources, wherein said multiple sets of memory resources comprise:
a first set of memory resources available for allocation for an application and multiple application threads of said application;
a second set of memory resources available for allocation for said multiple application threads; and
for each application thread of said multiple application threads, a corresponding additional set of memory resources available for allocation for said application thread;
monitoring run-time resource usage information for said application; and
dynamically balancing said multiple sets of memory resources between said multiple application threads by moving at least one memory resource between said multiple sets of memory resources based on comparison of said run-time resource usage information and a threshold;

wherein said dynamically balancing said multiple sets of memory resources between said multiple application threads comprises:
  proactively pulling at least one memory resource from said first set of memory resources to said second set of memory resources in response to determining said run-time resource usage information is less than or equal to said threshold; and
  proactively pushing at least one memory resource from said second set of memory resources to said first set of memory resources in response to determining said run-time resource usage information exceeds said threshold.

2. The system of claim 1, wherein said dynamically balancing said multiple sets of memory resources between said multiple application threads further comprises:
  based on said run-time resource usage information, selecting one resource balancing policy from a set of multiple resource balancing policies; and
  applying said selected resource balancing policy.

3. The system of claim 2, wherein said set of multiple resource balancing policies includes an active resource balancing policy and a passive resource balancing policy.

4. The system of claim 3, wherein dynamically balancing said multiple sets of memory resources between said multiple application threads further comprises:
  applying said active resource balancing policy in response to determining said run-time resource usage information is less than or equal to said threshold.

5. The system of claim 4, wherein applying said active resource balancing policy comprises proactively pushing at least one memory resource from said second set of memory resources to at least one additional set of memory resources corresponding to at least one application thread of said multiple application threads.

6. The system of claim 4, wherein applying said active resource balancing policy comprises proactively pulling at least one memory resource from said first set of memory resources to said second set of memory resources.

7. The system of claim 3, wherein dynamically balancing said multiple sets of memory resources between said multiple application threads further comprises:
  applying said passive resource balancing policy in response to determining said run-time resource usage information exceeds said threshold.

8. The system of claim 7, wherein applying said passive resource balancing policy comprises proactively pushing at least one memory resource from said second set of memory resources to said first set of memory resources.

9. The system of claim 7, wherein applying said passive resource balancing policy comprises proactively pulling at least one memory resource from at least one additional set of memory resources corresponding to at least one application thread of said multiple application threads to said second set of memory resources.

10. The system of claim 7, wherein at least one memory resource is provided to said second set of memory resources and at least one additional set of memory resources corresponding to at least one application thread of said multiple application threads on-demand.

11. A method for heap allocation, comprising:
  caching multiple sets of memory resources, wherein said multiple sets of memory resources comprise:
    a first set of memory resources available for allocation for an application and multiple application threads of said application;
    a second set of memory resources available for allocation for said multiple application threads; and
    for each application thread of said multiple application threads, a corresponding additional set of memory resources available for allocation for said application thread;
  monitoring run-time resource usage information for said application; and
  dynamically balancing said multiple sets of memory resources between said multiple application threads by moving at least one memory resource between said multiple sets of memory resources based on comparison of said run-time resource usage information and a threshold;
  wherein said dynamically balancing said multiple sets of memory resources between said multiple application threads comprises:
    proactively pulling at least one memory resource from said first set of memory resources to said second set of memory resources in response to determining said run-time resource usage information is less than or equal to said threshold; and
    proactively pushing at least one memory resource from said second set of memory resources to said first set of memory resources in response to determining said run-time resource usage information exceeds said threshold.

12. The method of claim 11, wherein said dynamically balancing said multiple sets of memory resources between said multiple application threads further comprises:
  based on said run-time resource usage information, selecting one resource balancing policy from a set of multiple resource balancing policies; and
  applying said selected resource balancing policy.

13. The method of claim 12, wherein said set of multiple resource balancing policies includes an active resource balancing policy and a passive resource balancing policy.

14. The method of claim 13, wherein dynamically balancing said multiple sets of memory resources between said multiple application threads further comprises:
  applying said active resource balancing policy in response to determining said run-time resource usage information is less than or equal to said threshold.

15. The method of claim 14, wherein applying said active resource balancing policy comprises proactively pushing at least one memory resource from said second set of memory resources to at least one additional set of memory resources corresponding to at least one application thread of said multiple application threads.

16. The method of claim 13, wherein dynamically balancing said multiple sets of memory resources between said multiple application threads further comprises:
  applying said passive resource balancing policy in response to determining said run-time resource usage information exceeds said threshold.

17. The method of claim 16, wherein applying said passive resource balancing policy comprises proactively pulling at least one memory resource from at least one additional set of memory resources corresponding to at least one application thread of said multiple application threads to said second set of memory resources.

18. The method of claim 16, wherein at least one memory resource is provided to said second set of memory resources and at least one additional set of memory resources corresponding to at least one application thread of said multiple application threads on-demand.

19. An apparatus for heap allocation, comprising:
at least one processor; and
a non-transitory processor-readable memory device storing instructions that when executed by said at least one processor causes said at least one processor to perform operations including:
caching multiple sets of memory resources, wherein said multiple sets of memory resources comprise:
a first set of memory resources available for allocation for an application and multiple application threads of said application;
a second set of memory resources available for allocation for said multiple application threads; and
for each application thread of said multiple application threads, a corresponding additional set of memory resources available for allocation for said application thread;
obtaining run-time resource usage information for said application; and
dynamically balancing said multiple sets of memory resources between said multiple application threads by moving at least one memory resource between said multiple sets of memory resources based on comparison of said run-time resource usage information and a threshold;
wherein said dynamically balancing said multiple sets of memory resources between said multiple application threads comprises:
proactively pulling at least one memory resource from said first set of memory resources to said second set of memory resources in response to determining said run-time resource usage information is less than or equal to said threshold; and
proactively pushing at least one memory resource from said second set of memory resources to said first set of memory resources in response to determining said run-time resource usage information exceeds said threshold.

20. The apparatus of claim 19, wherein said dynamically balancing said multiple sets of memory resources between said multiple application threads further comprises:
based on said run-time resource usage information, selecting one resource balancing policy from a set of multiple resource balancing policies; and
applying said selected resource balancing policy.

21. The apparatus of claim 20, wherein said set of multiple resource balancing policies includes an active resource balancing policy and a passive resource balancing policy.

22. The apparatus of claim 21, wherein dynamically balancing said multiple sets of memory resources between said multiple application threads further comprises:
applying said active resource balancing policy in response to determining said run-time resource usage information is less than or equal to said threshold.

23. The apparatus of claim 22, wherein applying said active resource balancing policy comprises proactively pushing at least one memory resource from said second set of memory resources to at least one additional set of memory resources corresponding to at least one application thread of said multiple application threads.

24. The apparatus of claim 22, wherein dynamically balancing said multiple sets of memory resources between said multiple application threads further comprises:
applying said passive resource balancing policy in response to determining said run-time resource usage information exceeds said threshold.

25. The apparatus of claim 24, wherein applying said passive resource balancing policy comprises proactively pulling at least one memory resource from at least one additional set of memory resources corresponding to at least one application thread of said multiple application threads to said second set of memory resources.

26. The apparatus of claim 24, wherein at least one memory resource is provided to said second set of memory resources and at least one additional set of memory resources corresponding to at least one application thread of said multiple application threads on-demand.

27. A non-transitory computer-readable medium having instructions which when executed on a computer perform a method for heap allocation, the method comprising:
caching multiple sets of memory resources, wherein said multiple sets of memory resources comprise:
a first set of memory resources available for allocation for an application and multiple application threads of said application;
a second set of memory resources available for allocation for said multiple application threads; and
for each application thread of said multiple application threads, a corresponding additional set of memory resources available for allocation for said application thread;
monitoring run-time resource usage information for said application; and
dynamically balancing said multiple sets of memory resources between said multiple application threads by moving at least one memory resource between said multiple sets of memory resources based on comparison of said run-time resource usage information and a threshold;
wherein said dynamically balancing said multiple sets of memory resources between said multiple application threads comprises:
proactively pulling at least one memory resource from said first set of memory resources to said second set of memory resources in response to determining said run-time resource usage information is less than or equal to said threshold; and
proactively pushing at least one memory resource from said second set of memory resources to said first set of memory resources in response to determining said run-time resource usage information exceeds said threshold.

28. The computer-readable medium of claim 27, wherein said dynamically balancing said multiple sets of memory resources between said multiple application threads further comprises:
based on said run-time resource usage information, selecting one resource balancing policy from a set of multiple resource balancing policies; and
applying said selected resource balancing policy.

* * * * *